(12) United States Patent
Montoya et al.

(10) Patent No.: US 10,689,947 B2
(45) Date of Patent: Jun. 23, 2020

(54) TESTABLE BACK PRESSURE VALVES

(71) Applicant: Chevron U.S.A. Inc., San Ramon, CA (US)

(72) Inventors: James Daniel Montoya, Santa Fe, NM (US); Heath Evan Lynch, Iowa Colony, TX (US); Jay Patrick Painter, League City, TX (US); Jacobo Rogelio Archuleta, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 185 days.

(21) Appl. No.: 15/840,833

(22) Filed: Dec. 13, 2017

(65) Prior Publication Data
US 2018/0163505 A1   Jun. 14, 2018

Related U.S. Application Data

(60) Provisional application No. 62/433,542, filed on Dec. 13, 2016.

(51) Int. Cl.
| | | |
|---|---|---|
| *E21B 34/02* | (2006.01) | |
| *F16K 37/00* | (2006.01) | |
| *E21B 33/04* | (2006.01) | |
| *F16K 17/18* | (2006.01) | |
| *F16K 15/02* | (2006.01) | |
| *F16K 15/18* | (2006.01) | |
| *F16K 15/06* | (2006.01) | |

(52) U.S. Cl.
CPC .............. *E21B 34/02* (2013.01); *E21B 33/04* (2013.01); *F16K 15/026* (2013.01); *F16K 15/063* (2013.01); *F16K 15/18* (2013.01); *F16K 17/18* (2013.01); *F16K 37/0083* (2013.01)

(58) Field of Classification Search
CPC ........... E21B 34/02; E21B 33/03; E21B 33/04
USPC ....................................... 137/614.2
See application file for complete search history.

(56) References Cited

U.S. PATENT DOCUMENTS

| | | | | |
|---|---|---|---|---|
| 2,241,288 | A * | 5/1941 | Yancey ................... | E21B 33/04 166/87.1 |
| 2,358,677 | A * | 9/1944 | Yancey ................... | E21B 33/03 166/80.1 |
| 3,409,078 | A * | 11/1968 | Knox ...................... | E21B 21/10 166/374 |
| 8,539,976 | B1 * | 9/2013 | Rodgers, Jr. .......... | F16K 15/066 137/512 |
| 2014/0116720 | A1 | 5/2014 | He et al. | |
| 2016/0186527 | A1 | 6/2016 | Cocker | |

FOREIGN PATENT DOCUMENTS

WO   WO-2018170500 A1 *   9/2018   ............. E21B 33/03

* cited by examiner

*Primary Examiner* — Giovanna C Wright
(74) *Attorney, Agent, or Firm* — King & Spalding LLP

(57) ABSTRACT

A testable back pressure valve can include a body. The valve can also include a first flow regulating device movably disposed within a top end of the body, where the first flow regulating device is configured to move from a first default position to a first position based on first flow characteristics of a first fluid that flows into a top end of the body toward a bottom end of the body. The valve can further include a second flow regulating device movably disposed within the bottom end of the body. The valve can also include a network of channels disposed within the body between the first flow regulating device and the second flow regulating device.

18 Claims, 17 Drawing Sheets

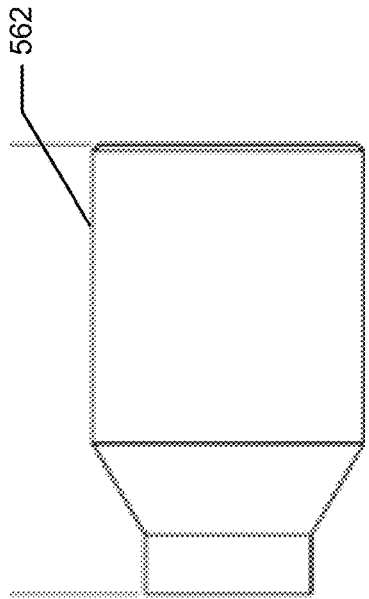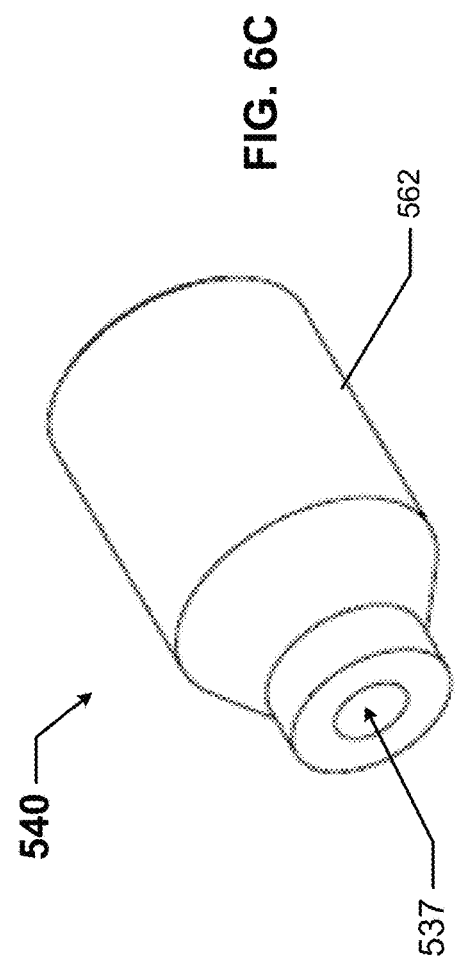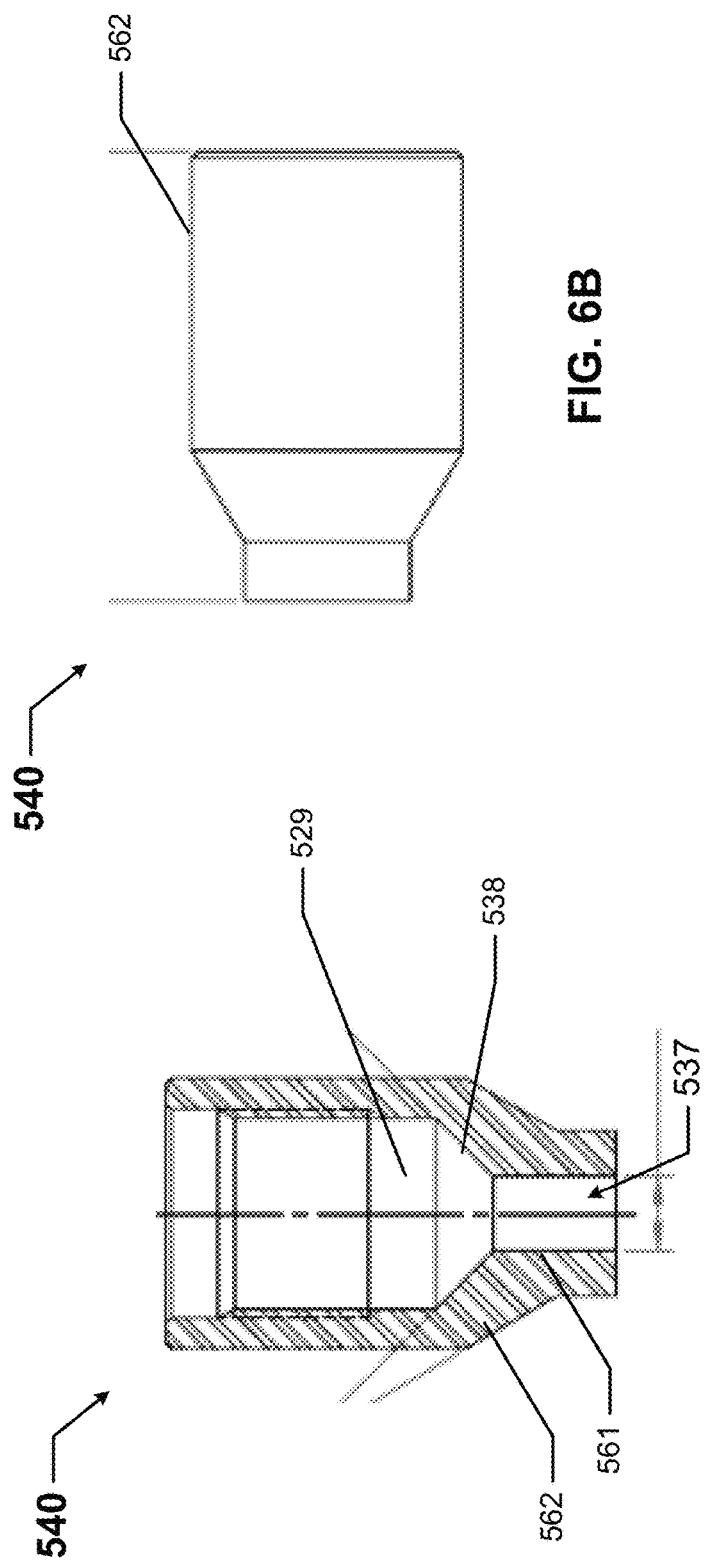
FIG. 6B
FIG. 6C
FIG. 6A

TESTABLE BACK PRESSURE VALVES

CROSS-REFERENCE TO RELATED APPLICATIONS

This application claims priority under 35 U.S.C. § 119 to U.S. Provisional Patent Application Ser. No. 62/433,542, titled "Testable Back Pressure Valves" and filed on Dec. 13, 2016, the entire contents of which are hereby incorporated herein by reference.

TECHNICAL FIELD

The present disclosure relates generally to subterranean field operations, and more specifically to assemblies used to test back pressure valves.

BACKGROUND

Back pressure valves and two way check valves are used to temporarily seal and contain oil and gas well fluids. For example, a back pressure valve can be used during removal of a pressure control system (e.g. blow out preventer (BOP)) and subsequent installation of production equipment (e.g. production tree). Conventional back pressure valves include various types of spring and plunger designs mounted to openings of tubing and casing hangers that accomplish sealing. However, conventional back pressure valves are not able to be tested once installed, and periodically thereafter if desired at test pressures and operational temperatures. In addition, there are two designs (back pressure valve and two way check valve) that are required for typical operation. This requires the removal of a back pressure valve, installation of a two way check valve to test against, subsequent removal of the two way check valve, and sometimes the subsequent re-installation of the back pressure valve. Therefore, there is a need in the industry for a back pressure valve that can also function as a two way check valve without removal, thus allowing for testing in situ.

SUMMARY

In general, in one aspect, the disclosure relates to a testable back pressure valve. The testable back pressure valve can include a body, and a first flow regulating device movably disposed within a top end of the body, where the first flow regulating device is configured to move from a first default position to a first position based on first flow characteristics of a first fluid that flows into a top end of the body toward a bottom end of the body. The testable back pressure valve can also include a second flow regulating device movably disposed within the bottom end of the body. The testable back pressure valve can further include a network of channels disposed within the body between the first flow regulating device and the second flow regulating device.

In another aspect, the disclosure can generally relate to a valve system. The valve system can include a casing head, and a testable back pressure valve disposed within the casing head. The testable back pressure valve can include a body, and a first flow regulating device movably disposed within a top end of the body, where the first flow regulating device is configured to move from a first default position to a first position within the cavity based on first flow characteristics of a first fluid that flows into a top end of the body toward a bottom end of the body. The testable back pressure valve can also include a second flow regulating device movably disposed within the bottom end of the body. The testable back pressure valve can further include a network of channels disposed within the body between the first flow regulating device and the second flow regulating device.

These and other aspects, objects, features, and embodiments will be apparent from the following description and the appended claims.

BRIEF DESCRIPTION OF THE DRAWINGS

The drawings illustrate only example embodiments of methods, systems, and devices for testable back pressure valves and are therefore not to be considered limiting of its scope, as testable back pressure valves may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 6A-6C show a first (in this case, an upper) portion of the testable back pressure valve of FIGS. 5A-5D in accordance with certain example embodiments.

DETAILED DESCRIPTION OF EXAMPLE EMBODIMENTS

Figure 1:
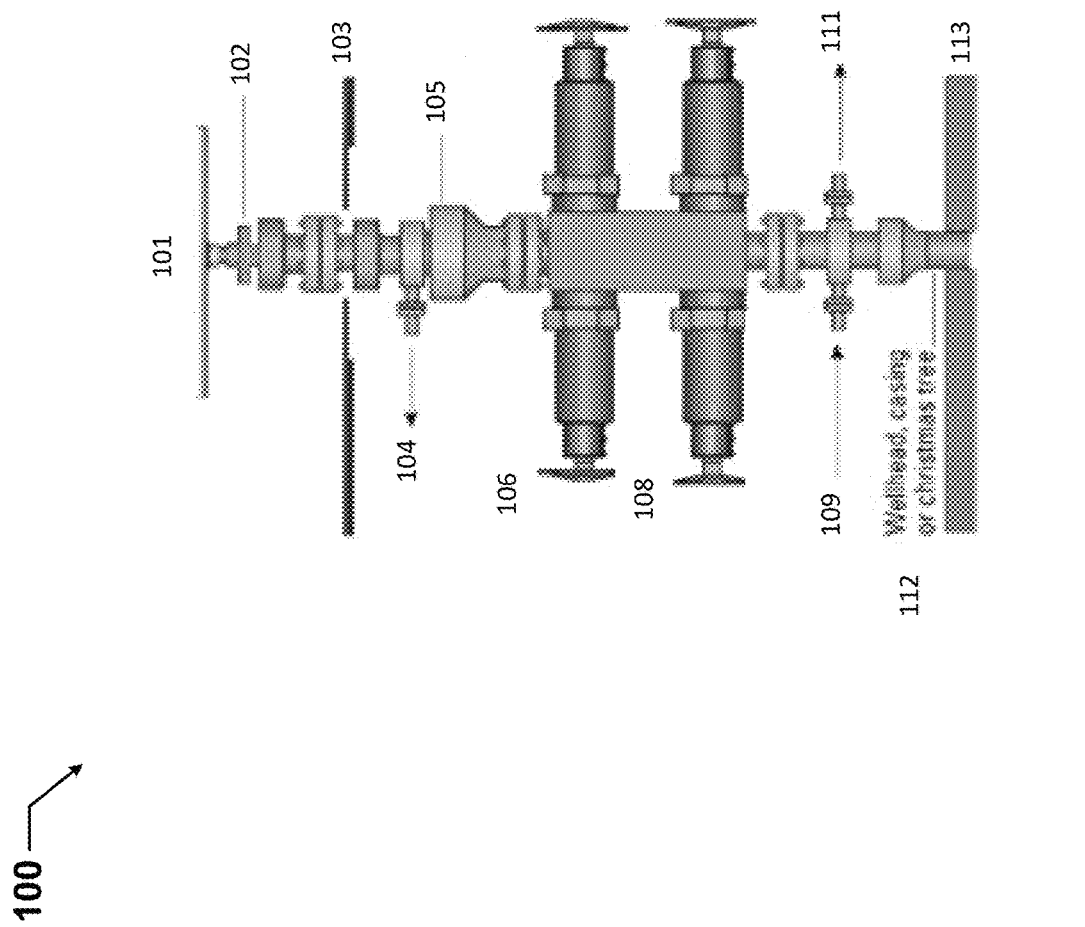
FIG. 1 shows a BOP system currently used in the art.

The example embodiments discussed herein are directed to systems, apparatuses, and methods of testable back pressure valves. While the testable back pressure valves shown in the figures and described herein are directed to use in a subterranean wellbore, example testable back pressure valves can also be used in other applications, aside from a wellbore, in which a core sample is needed. Thus, the examples of testable back pressure valves described herein are not limited to use in a subterranean wellbore.

Further, while some example embodiments described herein use hydraulic material and a hydraulic system to operate the testable back pressure valves described herein, example testable back pressure valves can also be operated using other types of systems, such as pneumatic systems. Thus, such example embodiments are not limited to the use of hydraulic material and hydraulic systems. A user as described herein may be any person that is involved with a field operation (e.g., between removal of a pressure control system, such as a BOP, and installation of production equipment, such as a production tree) in a subterranean wellbore. Examples of a user may include, but are not limited to, a roughneck, a company representative, a drilling engineer, a tool pusher, a service hand, a field engineer, an electrician, a mechanic, an operator, a consultant, a contractor, and a manufacturer's representative.

Any example testable back pressure valves, or portions (e.g., components) thereof, described herein can be made from a single piece (as from a mold). When an example testable back pressure valve or portion thereof is made from a single piece, the single piece can be cut out, bent, stamped, and/or otherwise shaped to create certain features, elements, or other portions of a component. Alternatively, an example testable back pressure valve (or portions thereof) can be made from multiple pieces that are machined and mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example subterranean coring assembly) can be made of one or more of a number of suitable materials, including but not limited to metals (e.g., stainless steel), ceramics, rubbers, and plastics. Materials are utilized based on functionality and design requirements, such as, for example, strength, sealing, and corrosion.

A coupling feature (including a complementary coupling feature) as described herein can allow one or more components and/or portions of an example testable back pressure valve to become mechanically coupled, directly or indirectly, to another portion of the testable back pressure valve and/or another component of a field system. A coupling feature can include, but is not limited to, a portion of a hinge, an aperture, a recessed area, a protrusion, a slot, a spring clip, a tab, a detent, and mating threads. One portion of an example testable back pressure valve can be coupled to another portion of a testable back pressure valve and/or another component of a field system by the direct use of one or more coupling features.

In addition, or in the alternative, a portion of an example testable back pressure valve can be coupled to another portion of the testable back pressure valve and/or another component of a field system using one or more independent devices that interact with one or more coupling features disposed on a component of the testable back pressure valve. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In certain example embodiments, field systems that include example testable back pressure valves are subject to meeting certain standards and/or requirements. For example, the American Petroleum Institute (API), the International Standards Organization (ISO), and the Occupational Health and Safety Administration (OSHA) set standards for field operations. Use of example embodiments described herein meet (and/or allow a corresponding field system to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of testable back pressure valves will be described more fully hereinafter with reference to the accompanying drawings, in which example embodiments of testable back pressure valves are shown. Testable back pressure valves may, however, be embodied in many different forms and should not be construed as limited to the example embodiments set forth herein. Rather, these example embodiments are provided so that this disclosure will be thorough and complete, and will fully convey the scope of testable back pressure valves to those of ordinary skill in the art. Like, but not necessarily the same, elements in the various figures are denoted by like reference numerals for consistency.

Terms such as "first", "second", "end", "inner", "outer", "top", "bottom", "upward", "downward", "upper", "lower", "middle", "up", "down", "distal", and "proximal" are used merely to distinguish one component (or part of a component or state of a component) from another. Such terms are not meant to denote a preference or a particular orientation. Also, the names given to various components described herein are descriptive of one embodiment and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a side view of a BOP system 100 (also called a BOP stack 100) in which example embodiments can be used. The BOP system 100 of FIG. 1 includes an injector head 101 located above the drill floor 103, with a stripper 102 located between the injector head 101 and the drill floor 103. The injector head 101 is part of a coiled tubing unit and includes one or more chain assemblies to grip a coiled tubing string. The injector head 101 can also include a hydraulic drive system for inserting and retrieving the coiled tubing string relative to the wellbore. The stripper 102 secures the base of the injector head 101.

Below the drill floor 103 is located a mud return line 104, followed downward by an annular blowout preventer 105, followed by blind rams 106, followed by shear rams 108, followed by a kill line 109 and a choke line 111, followed by the wellhead casing 112 located just above the surface 113. The mud return line 104 sends mud from downhole to a mud processing system for analysis and recirculation. The annular blowout preventer 105 is a large valve that is used to control wellbore fluids. The annular blowout preventer 105 commonly resembles a rubber donut that is inflated to seal around piping or, if no piping is present, to seal an open hole. The annular blowout preventer 105 is often redundant of downhole components (e.g., the shear rams 108) of the BOP system 100.

The blind rams 106 are two blocks of steel that meet in the center to close off an open hole. Usually, the ends of the blind rams 106 are blunted, and so are not designed to cut into pipe that might be disposed through the height of the BOP system 100. The shear rams 108 are like the blind rams 106, but the ends of the shear rams 108 are designed to shear through any pipe that might be disposed through the height of the BOP system 100. Once the pipe is cut (or sheared) by the shear rams 108, it is usually left hanging in the BOP system 100 (also called a BOP stack 100), which makes kill operations become more difficult. When the shear rams 108 operate, the joint of the drillpipe or tubing is destroyed in the process, but the rest of the string is unharmed by the operation of shear rams 108.

The kill line 109 is a series of high-pressure pipes leading from an outlet on the BOP stack 100 to high-pressure pumps. During normal well control operations, kill fluid is pumped through the drillstring, and annular fluid is taken out of the well through the choke line 111 to a backpressure choke, which drops the fluid pressure to atmospheric pressure. If the drillpipe is inaccessible, it may be necessary to pump heavy drilling fluid in the top of the well, wait for the fluid to fall under the force of gravity, and then remove fluid from the annulus.

The choke line 111 is a series of high-pressure pipes leading from an outlet on the BOP stack to the backpressure choke and associated manifold. During well-control operations, the fluid under pressure in the wellbore flows out of the well through the choke line 111 to the choke, reducing the fluid pressure to atmospheric pressure. The wellhead casing 112 (also called a casing head 112) is an adapter disposed between the first casing string and either the BOP system 100 (during drilling) or the production system 207 of FIGS. 2A and 2B (after completion). This wellhead casing 112 can be threaded or welded onto the casing, and it can have a flanged or clamped connection to match the BOP system 100 or production system 207.

Figure 2A:
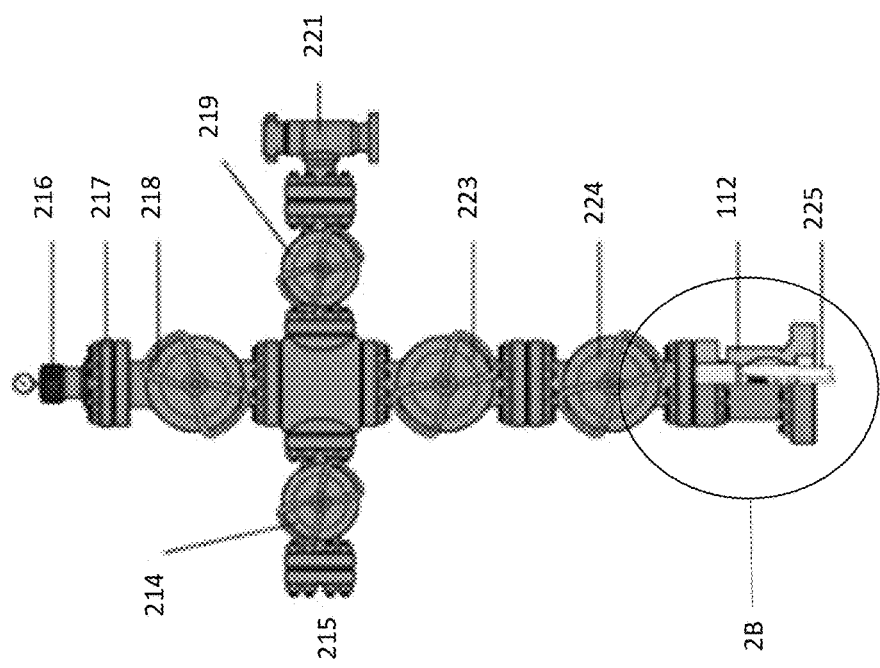
FIGS. 2A and 2B show a production system currently used in the art.
Figure 2B:
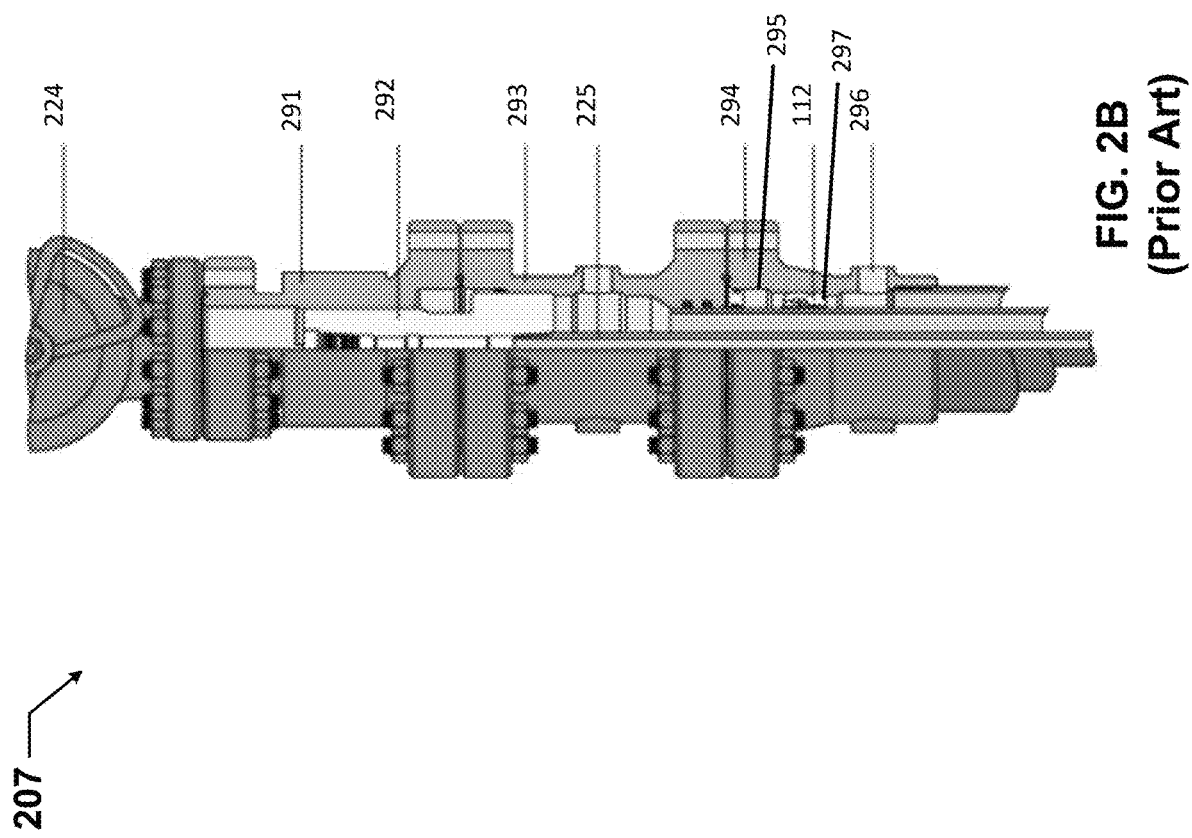

The BOP system 100 is used during drilling and other exploration-related operations of a subterranean field. When these operations are complete, then the BOP system 100 is removed and replaced by a production system 207 (also called a production tree 207 and a Christmas tree 207), as shown in FIGS. 2A and 2B. Referring to FIGS. 1-2B, the production tree 207 of FIGS. 2A and 2B includes the wellhead casing 112, working upward followed by a lower master valve 224 and an upper master valve 223. Above the upper master valve 223 are three branches, and so the formation lends itself to the name Christmas tree 207.

One branch upward from the upper master valve 223 includes a kill wing valve 214 followed by a kill wing connection 215. A second branch upward from the upper master valve 223 includes a swab valve 218, a tree adapter 217, and a tree cap and gauge 216. The third branch upward from the upper master valve 223 includes a production wing valve 219 followed by a surface choke 221.

Below the lower master valve 224, a more detailed semi-cross sectional side view of the production tree 207 is shown in FIG. 2B. These components of FIG. 2B are also found below the kill line 109 and choke line 111 of the BOP system 100. Specifically, working downward from the lower master valve 224 is the tubing head adapter 291 followed by the tubing head 293, both of which are used to encase and support the tubing hanger 292. Below the tubing hanger 292 is the tubing string 225. Below the tubing head 293 is the casing bowl 294, which is used to house and support the casing hanger cap 295, the casing hanger 297, and the casing head 112. The casing bowl 294 can include a port 296 for a casing valve.

Figure 3:
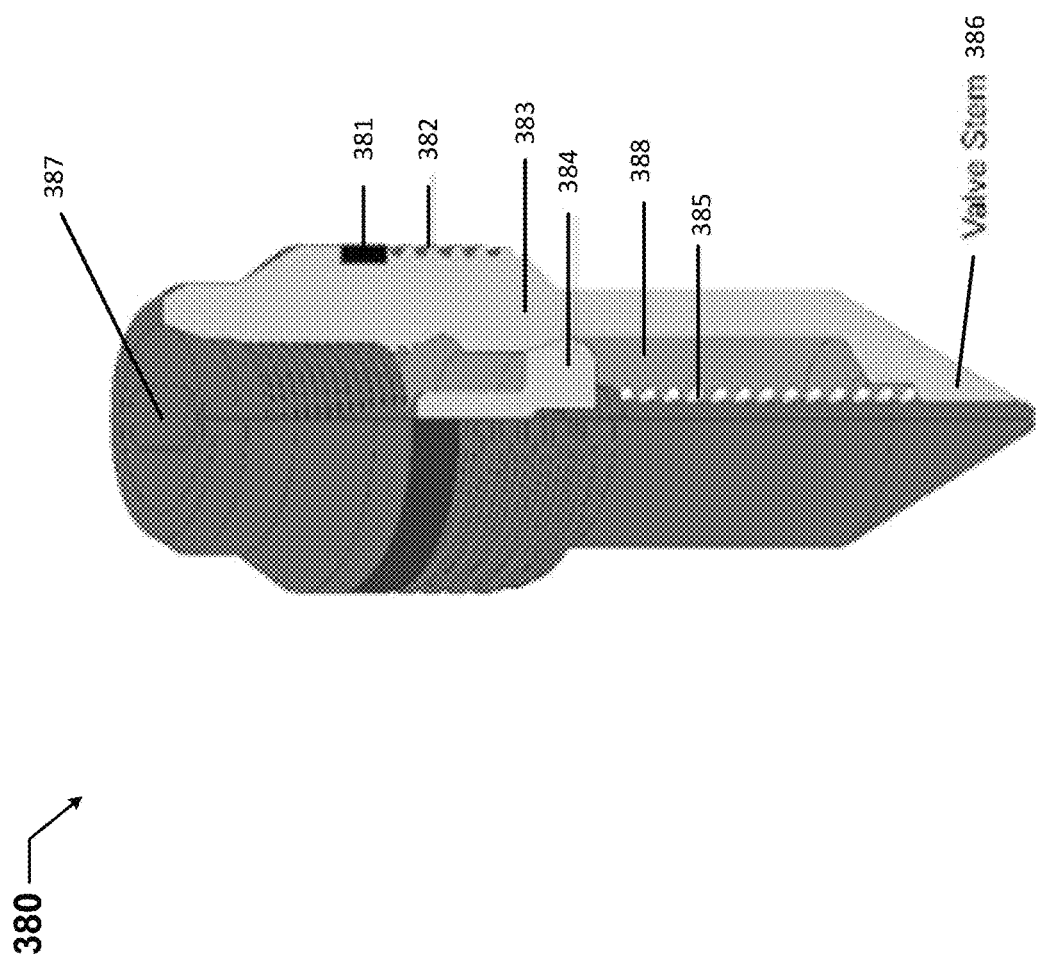
FIG. 3 shows a back pressure valve currently used in the art.

As the BOP system 100 of FIG. 1 is replaced by the production system 207 of FIGS. 2A and 2B, a back pressure valve 380 in the current art, as shown in FIG. 3, is installed in the tubing hanger 292 to isolate the production tubing 225. The back pressure valve 380 is designed to hold pressure from below, yet enable fluids to be pumped from above downhole, as may be required for well-control purposes. Referring to FIGS. 1-3, the back pressure valve 380 of the current art includes a body 383 that has an outer surface that includes mating threads 382 and one or more channels into which one or more sealing members 381 (e.g., gaskets, o-rings) can be disposed.

The body 383 forms a cavity 388 inside of which are disposed a valve 384 and a spring 385 disposed under the valve 384. The spring 385 forces the valve 384 upward against the body 383, unless a downward force from fluid being forced downhole is large enough to overcome the upward force of the spring 385. There is an aperture 387 in the top of the body 383 through which such fluid can flow to reach the top of the valve 384. The bottom of the body includes a valve stem 386.

As discussed above, back pressure valves in the current art, such as back pressure valve 380, are effective at preventing the uncontrolled flow of downhole hydrocarbon fluids and gasses to the surface, but allows fluids to be pumped into the wellbore for well control/kill operations. However, back pressure valves in the current art, such as back pressure valve 380, cannot be tested once they are installed. By contrast, example back pressure valves, such as shown and described herein, not only prevent the uncontrolled flow of downhole hydrocarbon fluids and gasses to the surface and allow fluids to be pumped into the wellbore for well control/kill operations, but example back pressure valves can be tested once they are installed. Specifically, the pressure barriers of example back pressure valves are fully testable, both above and below the back pressure valve unit, after installation.

Figure 4A:
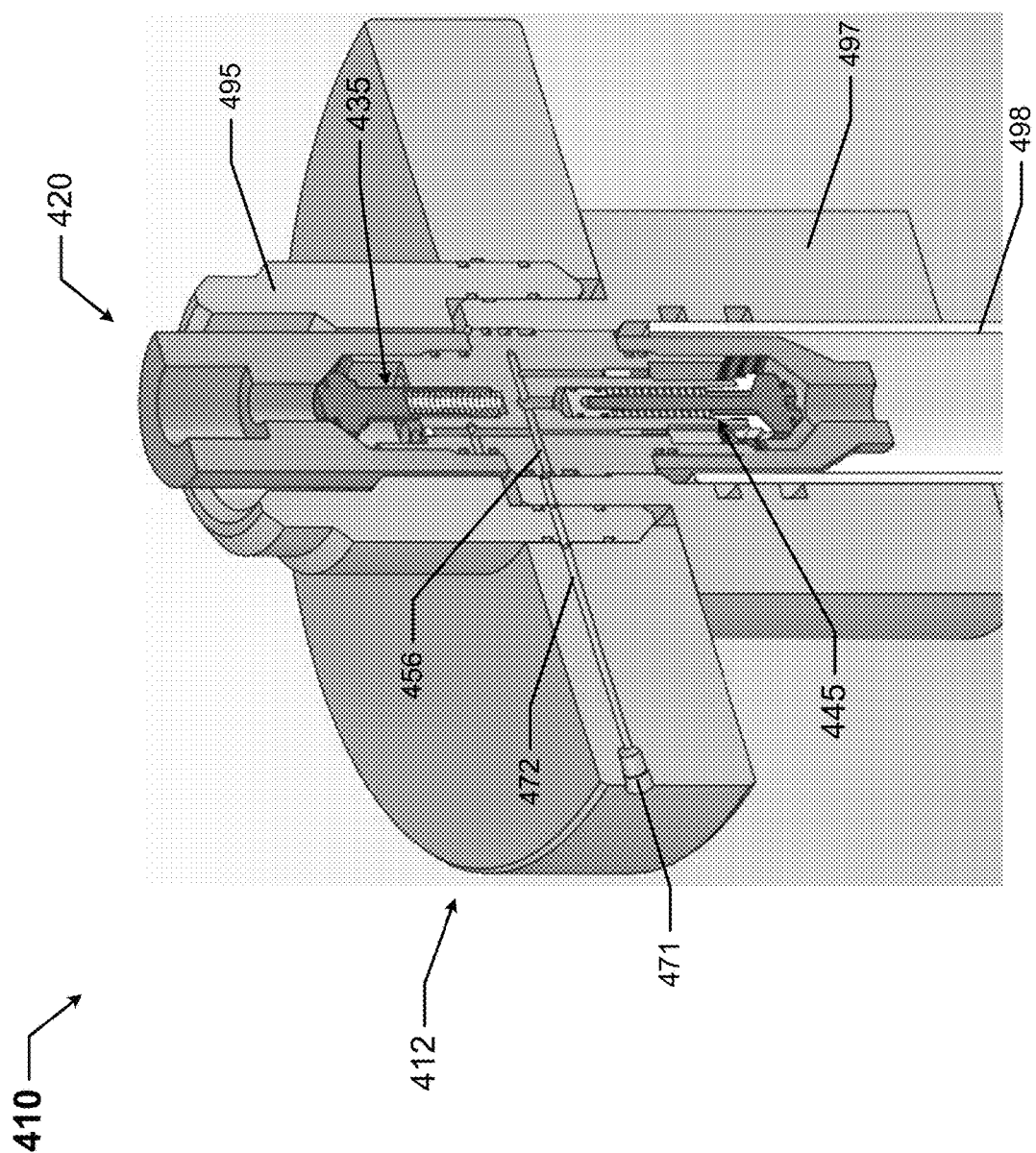
FIGS. 4A-4C show a valve system, which includes a testable back pressure valve installed in a wellhead, where the testable back pressure valve is in a default position, in accordance with certain example embodiments.
Figure 4B:
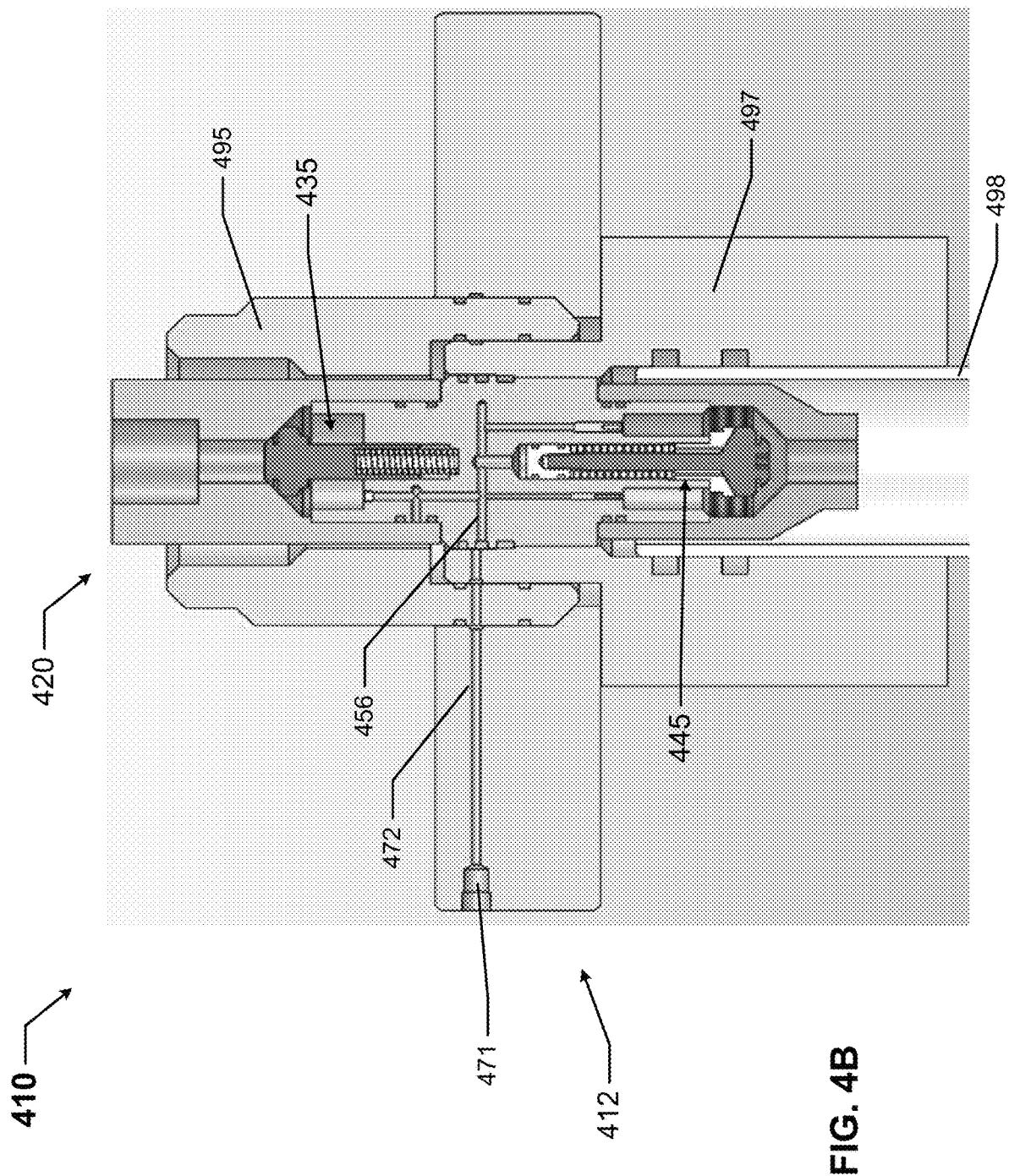
Figure 4C:
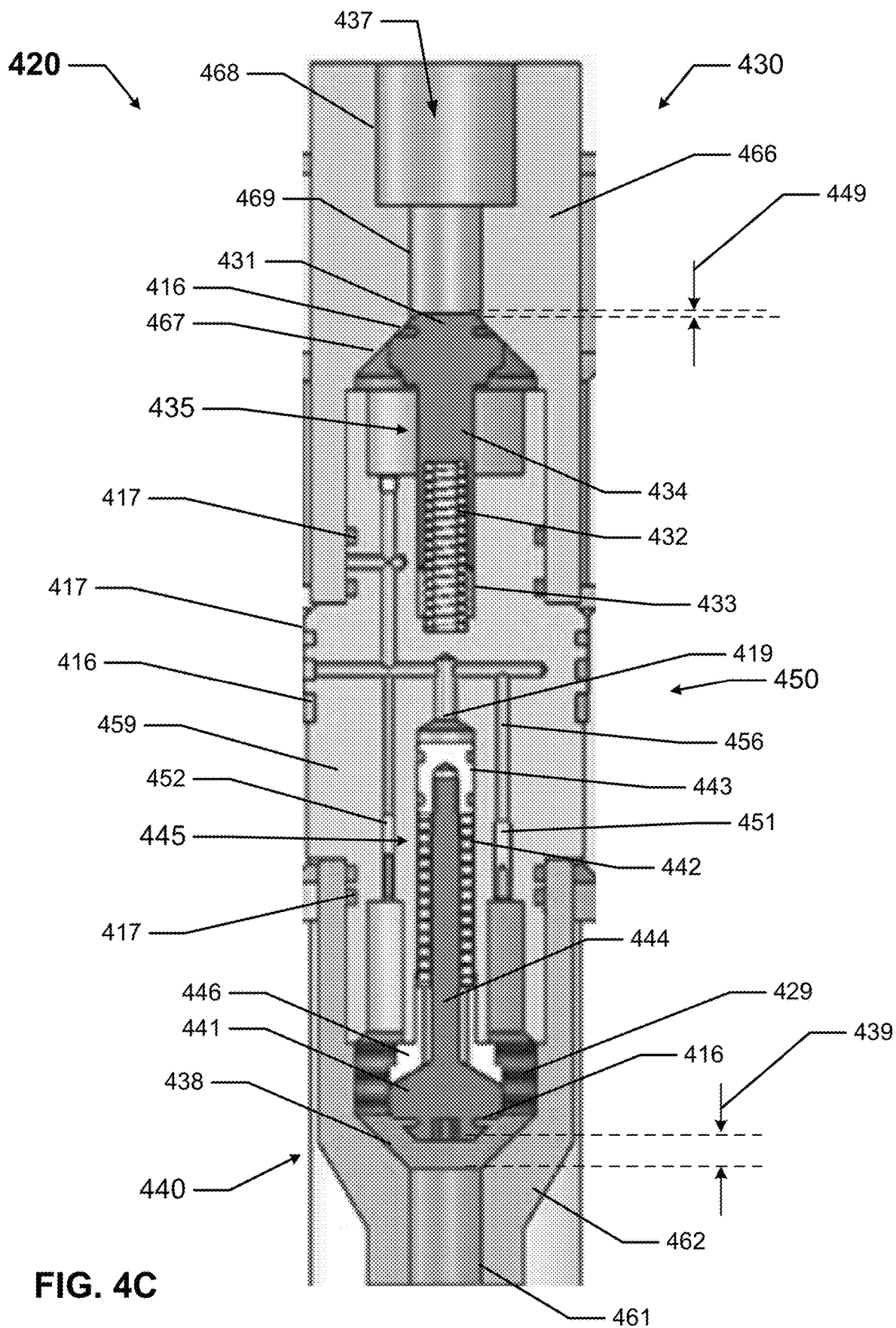

FIGS. 4A-4C show a valve system 410 in a default position in accordance with certain example embodiments. Specifically, FIG. 4A shows a cross-sectional isometric view of the valve system 410. FIG. 4B shows a cross-sectional side view of the valve system 410, sectioned along the cylindrical axis of the back pressure valve 420. FIG. 4C shows a cross-sectional side view of the example back pressure valve 420 of the valve system 410.

Referring to FIGS. 1-4C, the valve system 410 includes the back pressure valve 420, which is surrounded by a casing head 412, a casing hanger 497, a casing string 498 that hangs from the casing hanger 497, and a casing hanger cap 495. (In some cases, the casing hanger cap 495 can be considered part of the casing hanger 497.) Because the example back pressure valve 420 is testable, the casing head 412 includes a test port 471 at its outer edge and a channel 472 that leads from the test port 471 to the back pressure valve 420.

The example testable back pressure valve 420 can be used/mounted at any of a number of locations in a valve system 410. For example, the back pressure valve 420 can be disposed within the casing hanger 497, as shown in FIGS. 4A-4C. As another alternative, the back pressure valve 420 can be disposed within a tubing hanger. Further, the back pressure valve 420 can be configured in any of a number of ways. For example, in this case, the back pressure valve 420 utilizes a standard 5" Type-H prep connection. Example testable back pressure valves 420 can withstand a range of test pressures (e.g., up to 10,000 psi), a range of temperatures (e.g., up to 180° C.), and a range of kill fluid flow rates (e.g., equivalent to maximum kill fluid flow rates withheld by standard 5" Type-H back pressure valves currently used in the art).

The back pressure valve 420 can be a single piece or an assembly of multiple pieces. For example, back pressure valve 420 in this case is made of an upper portion 430, a lower portion 440, and a middle portion 450 disposed therebetween. The example back pressure valve 420 of FIGS. 4A-4C can also include one or more flow regulating devices (e.g., flow regulating device 435, flow regulating device 445) that are disposed within the back pressure valve 420, enclosed by one or more of the various bodies (e.g., body 466 of the upper portion 430, body 459 of the middle portion 450, body 462 of the lower portion 440) of the back pressure valve 420 during all modes of operation (e.g., normal mode of operation, test mode of operation, kill fluid flow mode of operation).

A flow regulating device can have any of a number of components and/or configurations. When an example back pressure valve 420 has multiple flow regulating devices, one flow regulating device can be the same as, or different than, one or more of the other flow regulating devices. In this example, there are two flow regulating devices (flow regulating device 435 and flow regulating device 445) that are float valves having different configurations and that are inverted relative to each other. Flow regulating device 435 is oriented upward (into the flow of fluid starting through the upper portion 430 of the back pressure valve 420 toward the lower portion 440), and flow regulating device 445 is disposed in the opposite direction.

The flow regulating device 435 of FIGS. 4A-4C includes a conically-shaped plunger valve 431, around a portion of which can be disposed an optional sealing member (e.g., a gasket, an o-ring, a high temperature high pressure elastomeric seal) disposed in a channel 416. An extension 434 is disposed between a guide bore 433 of the body 459 and the plunger valve 431. The flow regulating device 435 of FIGS. 4A-4C also includes a resilient device 432 disposed within the extension 434 and coupled to the guide bore 433 of the body 459. The guide bore 433 in this case is a feature within the body 459 of the middle portion 450. In some cases, the resilient device 432 can be combined with the extension 434 and/or the guide bore 433. The resilient device 432 is used to control the position and preload force of the plunger valve 431 of the flow regulating device 435 relative to the valve seat 467, which is an inner surface of part of the body 466 of the upper portion 430.

Similarly, flow regulating device 445 of FIGS. 4A-4C includes a conically-shaped plunger valve 441, around a portion of which is disposed an optional sealing member (e.g., a gasket, an o-ring, a high temperature high pressure elastomeric seal) disposed in a channel 416. An extension 444 is disposed between a piston 443 of the body 462 and the plunger valve 441. The flow regulating device 445 of FIGS. 4A-4C also includes a resilient device 442 wrapped around the extension 444 and disposed between the piston 443 of the body 462, a retaining feature 446, and the plunger valve 441. The resilient device 442 is used to control the position of the plunger valve 441 of the flow regulating device 445 relative to the valve seat 438, which is an inner surface of part of the body 462 of the lower portion 440. The plunger valve 441 can be subjected to drag forces during normal flow of liquids into the wellbore, and the resilient device 442 must be structurally adequate to resist this drag force and retain the plunger valve 441 in position. The resilient device 442 must also be compliant in order to facilitate the actuation of the plunger valve 441, the extension 444, and the piston 443 during testing. There is a volume of space 429 (also sometimes called a test chamber 429) within the lower portion 440 adjacent to the flow regulating device 445.

The flow regulating device 445 can also include the retaining feature 446, which is located around the extension 444 and also between the plunger valve 441 and the resilient device 442. The retaining feature 446 can be used to anchor one end of the resilient device 442. The retaining feature 446 can also be used to provide a stop that limits the plunger valve 441 at a fully open position, as shown in FIGS. 4A-4C. When in the flow regulating device 445 is in the fully open position, plunger valve 441 is recessed into the retaining feature 446, which reduces the amount of fluid body drag force that is applied during pumping that could cause the plunger valve 441 to seat and prevent fluid flow, as described above. This, in conjunction with the resilient device 442, is designed to keep the plunger valve 441 from seating when kill fluid is flowing at its maximum rate.

The plunger valve 431 of flow regulating device 435 is directed toward the valve seat 467 of the upper portion 430 of the back pressure valve 420 via the resilient member 432, and is nominally closed preventing escape of wellbore fluids to the surface. The plunger valve 441 of flow regulating device 445 is directed toward the valve seat 438 of the lower portion 440 of the back pressure valve 420, which is nominally open, and actuated closed during testing of the back pressure valve 420. There can additionally or alternatively be one or more of a number of other components that can be used to secure one or both of the flow regulating devices, including but not limited to braces, brackets, and fastening devices.

As discussed above, the valve seat 467 of the upper portion 430 can be used to restrict how far the plunger valve 431 of the flow regulating device 435 can extend. Specifically, the valve seat 467 of the upper portion 430 can be configured to receive the plunger valve 431 of flow regulating device 435 so that, when the plunger valve 431 abuts against the valve seat 467 during testing, no fluid can flow into the middle portion 450 of the back pressure valve 420. This functionality can facilitate pressure testing of components above the back pressure valve 420, since the back pressure valve 420 is completely sealed in both directions.

The valve seat 467 can have any of a number of components and/or configurations. For example, in this case, the valve seat 467 is part of an inner surface of the upper portion 430 and is angled in a manner that mirrors the outer surface of the plunger valve 431. In this way, when the plunger valve 431 abuts against the valve seat 467 of the upper portion 430, the plunger valve 431 blocks the passage of fluid through the cavity 437 that forms through the remainder (and, more specifically, through the network of channels 456 in the middle portion 450 and beyond) of the back pressure valve 420.

As another example, valve seat 438 can be used to restrict how far the plunger valve 441 of the flow regulating device 445 can extend downward. Specifically, the valve seat 438 can be configured to receive the plunger valve 441 of flow regulating device 445 so that, when the plunger valve 441 abuts against the valve seat 438, no fluid can flow beyond that point in the cavity 437. The valve seat 438 can have any of a number of components and/or configurations. For example, in this case, the valve seat 438 is part of an inner surface of the lower portion 440 and is angled in a manner that mirrors the outer surface of the plunger valve 441. In this way, when the plunger valve 441 abuts against the valve seat 438 of the lower portion 440, the plunger valve 441 blocks the passage of fluid (either upward from downhole or downward from above) therethrough.

As discussed above, each flow regulating device is movable. Specifically, flow regulating device 435 is movable within the middle portion 450 and the upper portion 430 of the back pressure valve 420, and flow regulating device 445 is movable within the middle portion 450 and the lower portion 440 of the back pressure valve 420. The position of a flow regulating device can regulate the amount of fluid that flows through that portion of the back pressure valve. In this case, the plunger valve 431 of flow regulating device 435 can move toward and away from the guide bore 433, which is anchored toward the top side of the middle portion 450, and the plunger valve 441 of flow regulating device 445 can move toward and away from the piston 443, which is anchored to the bottom side of the middle portion 450 in cavity 419 (also called a piston chamber 419) of the middle portion 450.

The position of a plunger valve of a flow regulating device (or portion thereof) within the back pressure valve 420 can be measured or defined in any of a number of ways. For example, the position of flow regulating device 435 can be defined as the distance 449 between the valve seat 467 and the top (distal end) of the plunger valve 431. In FIGS. 4A-4C, which show flow regulating device 435 in a default (in this case, closed) position, the position of flow regulating device 435 is defined by distance 449.

Figure 9:
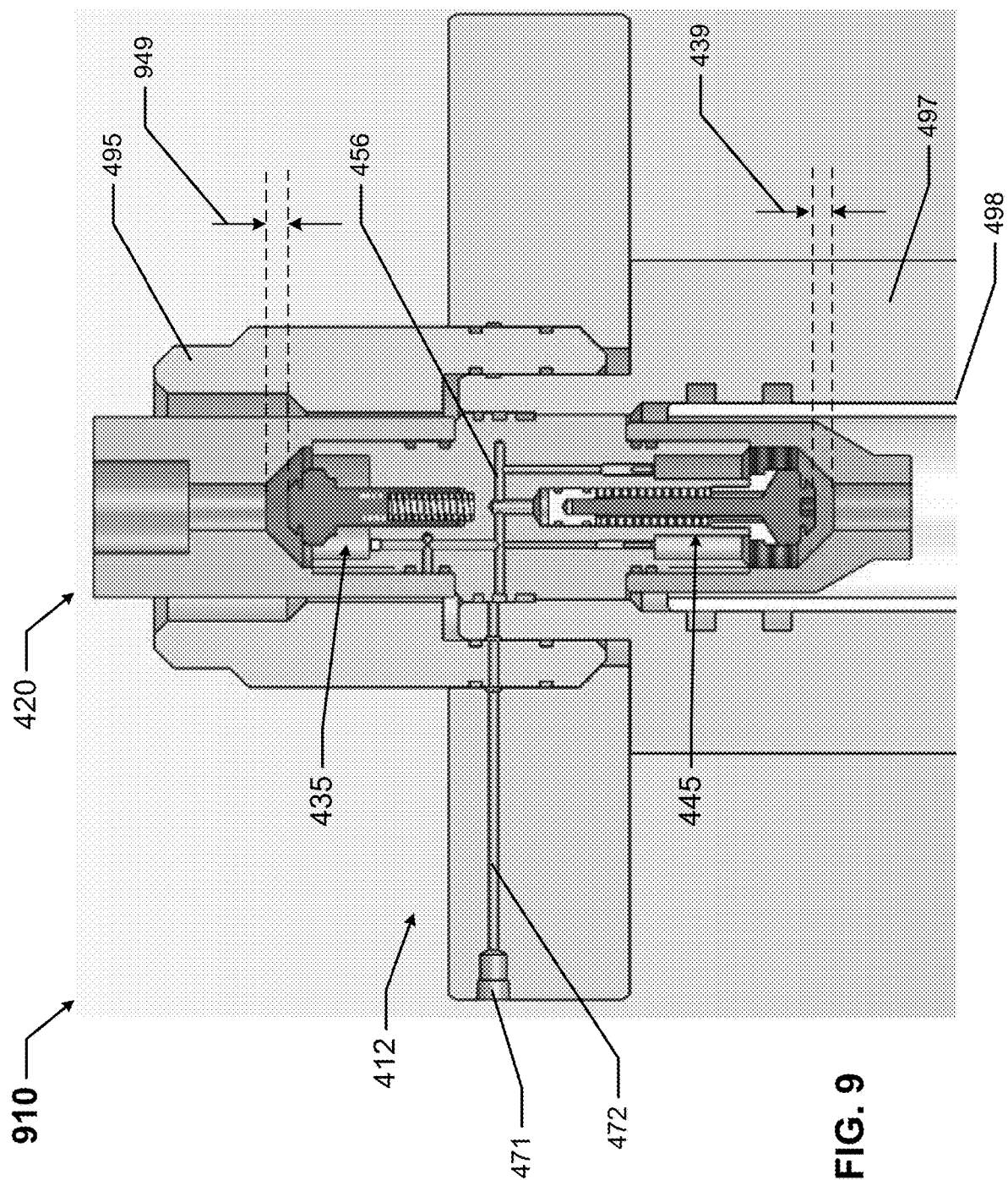
FIG. 9 shows the valve system of FIGS. 4A-4C configured in a first mode of operation in accordance with certain example embodiments.

Due to the H-Type prep connection configuration of the back pressure valve 420, the resilient device 432 of the flow regulating device 435 preloads the plunger valve 431 against the valve seat 467 and seals any existing downhole pressures to any applicable maximum test pressures. However, if well kill fluid is required to be pumped down into the wellbore, sufficient fluid pressure is applied above the plunger valve 431 so as to overcome the force of the resilient device 432 and cause the plunger valve 431 to unseat from the valve seat 467 and move downward, allowing fluid to be pumped downhole, as shown in FIG. 9 below.

Similarly, as shown in FIGS. 4A-4C, the position of flow regulating device 445 can be defined as the distance 439 between the valve seat 438 and the top (distal end) of the plunger valve 441. In FIGS. 4A-4C, which shows flow regulating device 445 in a default (in this case, fully open) position, the position of flow regulating device 445 is defined by distance 439. Other positions of flow regulating device 435 and flow regulating device 445 are shown below.

The movement of flow regulating device 435 and flow regulating device 445 (and any other applicable flow regulating devices if the back pressure valve 420 has more than two) can be independent of each other. The position of a flow regulating device of the back pressure valve 420 can be adjusted in any one or more of a number of ways. For example, in this case, the positions of flow regulating device 435 and flow regulating device 445 are adjusted hydraulically (e.g., by the flow of fluid through network of channels 456, via the test port 471 of the casing head 412). The position of a flow regulating device of the back pressure valve 420 can additionally or alternatively be adjusted and controlled hydraulically using any other means (e.g., electronically, as by using a motor disposed within the body 459 of the middle portion 450.

If the position of a flow regulating device is controlled electrically, then a controller can be used to control the position of a flow regulating device. Such a controller can include one or more of a number of components, including but not limited to a hardware processor, a memory, a control engine, a storage repository, a communication module, a transceiver, a timer, a power module, and an application interface. In addition, in these latter examples, the controller can work in conjunction with one or more other components, including but not limited to wireless communication hardware, sensors, electrical cables, hydraulic lines, motors, compressors, and switches.

The example back pressure valve 420 can have any of a number of other features in order to facilitate interface with various seal configurations. For example, as shown in FIGS. 4A-4C, there can be a number of channels 416 disposed along various outer surfaces of the body 459 of the middle portion 450 of the back pressure valve 420. In such a case, one or more sealing members (e.g., gaskets, o-rings, high temperature high pressure elastomeric seals) can be disposed within each channel 416 to provide a seal between the middle portion 450 of the back pressure valve 420 and another component of the back pressure valve 420 and/or another component of the valve system 410.

In addition, there can be a number of coupling features 417 (e.g., mating threads) disposed on various outer surfaces of the body 459 of the middle portion 450, various inner surfaces of the body 466 of the upper portion 430, and various inner surfaces of the body 462 of the lower portion 440. These coupling features 417 allow one portion (e.g., the middle portion 450) to couple to another portion (e.g., the upper portion 430, the lower portion 440) of the back pressure valve 420 and/or another component (e.g., the casing hanger 497) of the valve system 410.

In addition to the valve seat 467, the upper portion 430 can have one or more inner surfaces disposed in the body 466. For example, inner surface 468 and inner surface 469, located adjacent to each other at the top end of the upper portion 430, can be configured (e.g., have a shape and size) in such a way as to receive another component (e.g., an upper test port valve 1175 as discussed below in FIG. 11) of the system 410. In some cases, one or more channels can be disposed within the body 466.

In addition to the valve seat 438, the lower portion 440 can have one or more inner surfaces disposed in the body 462. For example, inner surface 461, located at the bottom end of the lower portion 440, can be configured (e.g., have a shape and size) in such a way as to receive another component of the system 410. In some cases, while not shown in FIGS. 4A-4C, one or more channels can be disposed within the body 462.

As discussed above, the middle portion 450 can have one or more of a number of channels 456 disposed in the body 459. This network of channels 456 can traverse the height of the middle portion 450 and allow fluid to flow therethrough, where this fluid can change the position of one or more of the flow regulating devices of the back pressure valve 420. Within the network of channels 456 can be disposed one or more of a number of components. For example, as shown in FIGS. 4A-4C, a test chamber fill port pressure relief check valve 451 and a test chamber return port check valve 452 can be disposed at one or more locations in the network of channels 456 of the middle portion 450. These networks of channels function to direct flow to the piston chamber 419 and the test chamber 429.

Figure 5A:
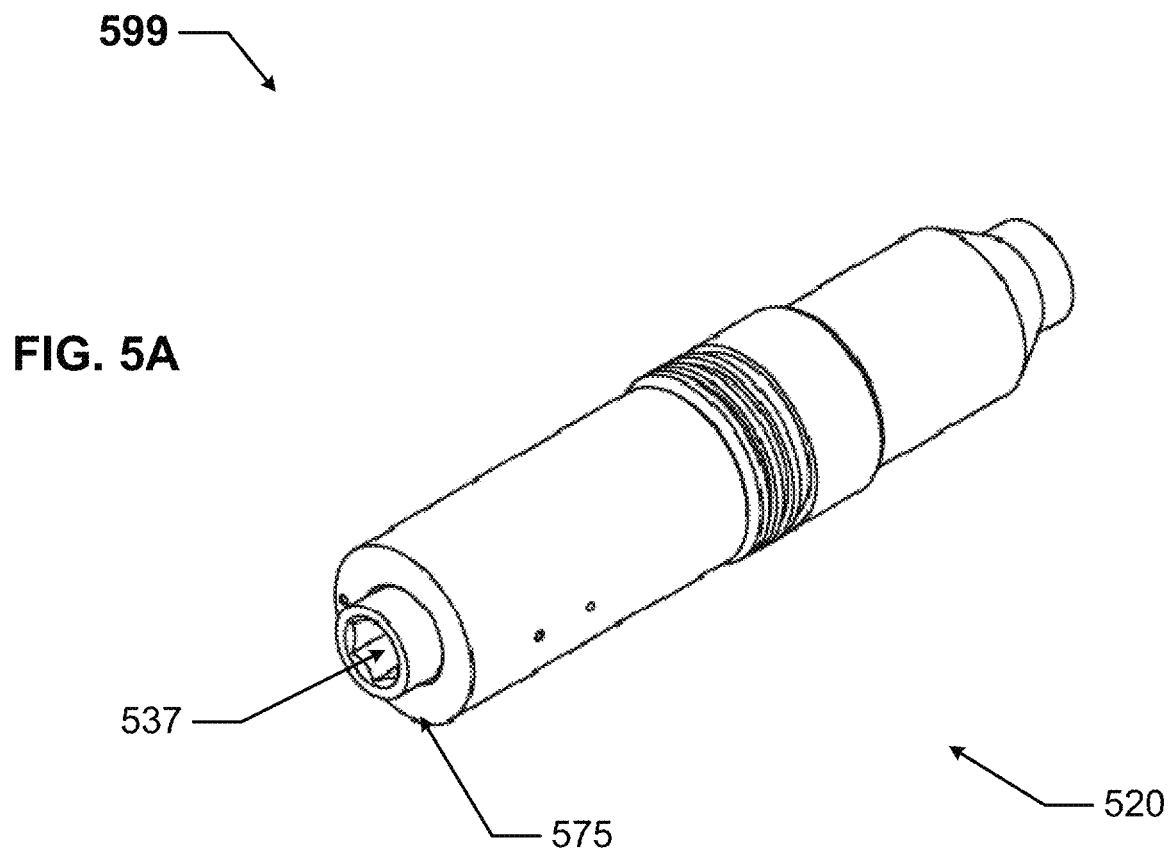
FIGS. 5A-5D show another valve system, which in this case includes a testable back pressure valve uninstalled from a wellhead, where the testable back pressure valve is in a default position in accordance with certain example embodiments.

FIGS. 5A-8D show another valve system 599 in accordance with certain example embodiments. Specifically, FIG. 5A shows an isometric view of the valve system 599. FIG. 5B shows a top view of the valve system 599. FIG. 5C shows a cross-sectional side view of the valve system 599. FIG. 5D shows a cross-sectional side view of a detail, as shown in FIG. 5C, of the valve system 599. FIG. 6A shows a cross-sectional side view of the lower portion 540 of the back pressure valve 520 of FIGS. 5A-5D. FIG. 6B shows a side view of the lower portion 540 of the back pressure valve 520 of FIGS. 5A-5D. FIG. 6C shows an isometric view of the lower portion 540 of the back pressure valve 520 of FIGS. 5A-5D.

Figure 7B:
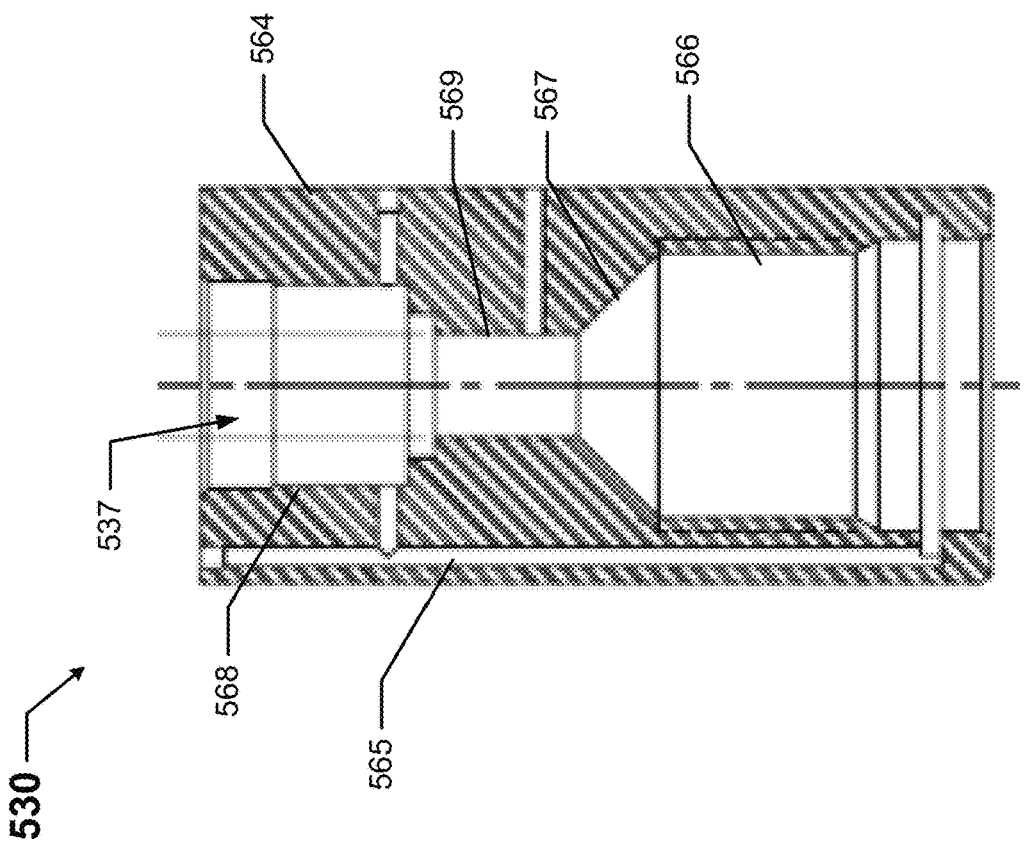
FIGS. 7A and 7B show a second (in this case, an upper) portion of the testable back pressure valve of FIGS. 5A-5D in accordance with certain example embodiments.
Figure 7A:
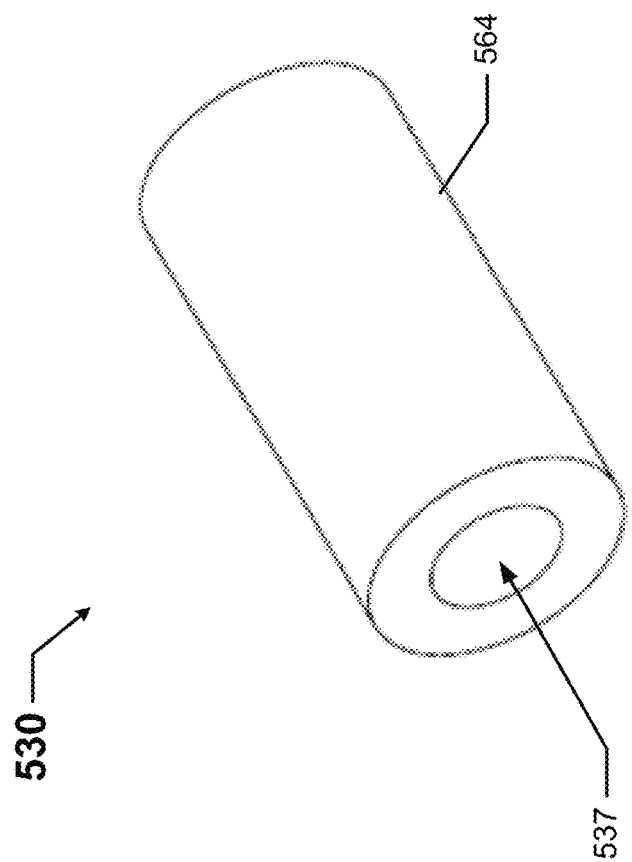
Figure 8A:
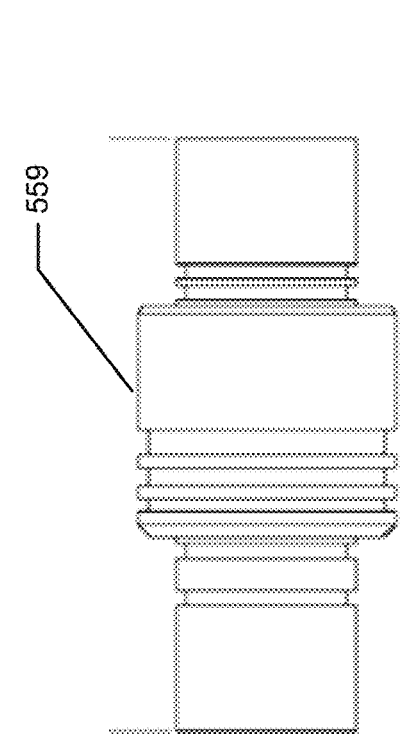
FIGS. 8A-8D show a third portion of the testable back pressure valve of FIGS. 5A-5D in accordance with certain example embodiments.
Figure 8B:
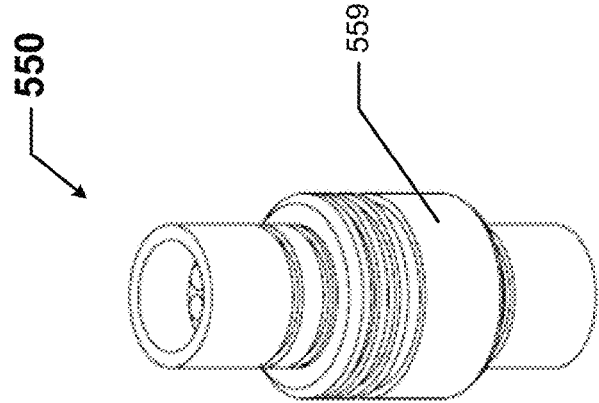
Figure 8C:
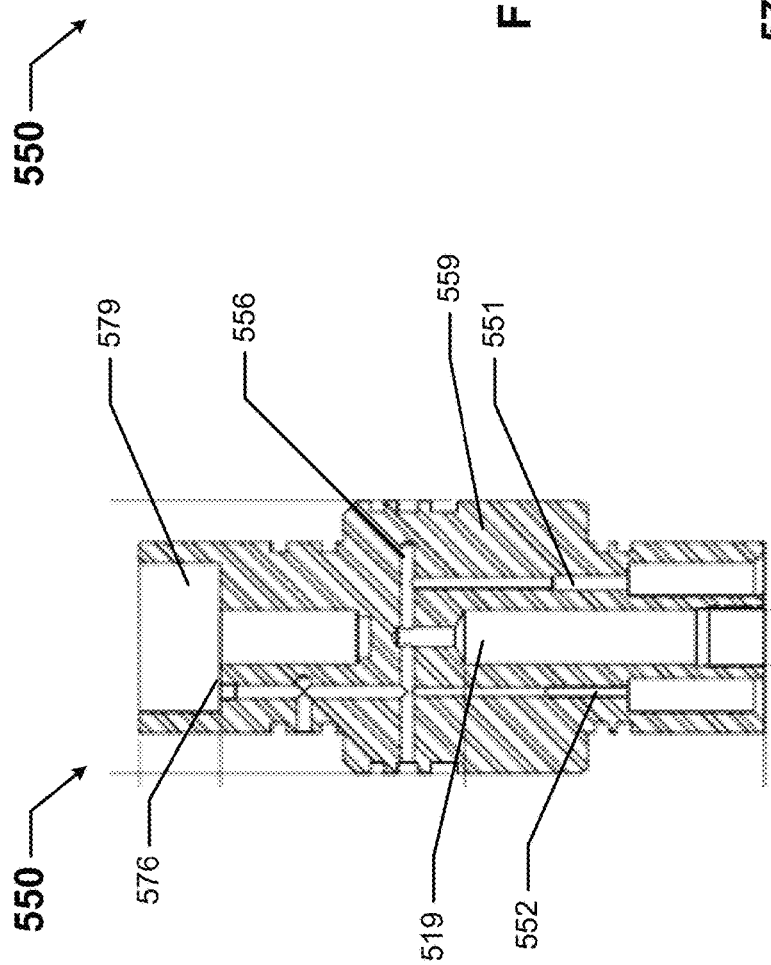
Figure 8D:
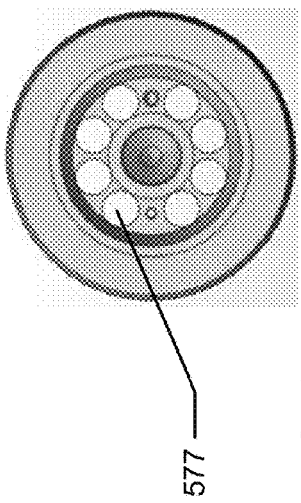

FIG. 7A shows an isometric view of the upper portion 530 of the back pressure valve 520 of FIGS. 5A-5D. FIG. 7B shows a cross-sectional side view of the upper portion 530 of the back pressure valve 520 of FIGS. 5A-5D. FIG. 8A shows a cross-sectional side view of the middle portion 550 of the back pressure valve 520 of FIGS. 5A-5D. FIG. 8B shows a top view of a flow port header 576 of the middle portion 550 of the back pressure valve 520 of FIGS. 5A-5D. FIG. 8C shows a side view of the middle portion 550 of the back pressure valve 520 of FIGS. 5A-5D. FIG. 8D shows a front-side-bottom view of the middle portion 550 of the back pressure valve 520 of FIGS. 5A-5D.

Referring to FIGS. 1-8D, the valve system 599 of FIGS. 5A-8D includes a back pressure valve 520 and an upper test port valve 575. The back pressure valve 520 of the valve system 599 of FIGS. 5A-8D can be substantially the same as the back pressure valve 420 of FIGS. 4A-4D, except as described below. For example, the back pressure valve 520 of FIGS. 5A-8D is made of a lower portion 540, an upper portion 530, and a middle portion 550, which are coupled to each other. The valve system 599 is an embodiment of the valve system 410 of FIGS. 4A-4C, however providing hydraulic or pneumatic actuation pressure via through the test port valve 575 in lieu of through the test ports 471.

The example back pressure valve 520 of FIGS. 5A-8D also includes two flow regulating devices, flow regulating device 535 and flow regulating device 545. The two flow regulating devices (flow regulating device 535 and flow regulating device 545) are float valves that are inverted relative to each other. Specifically, flow regulating device 535 is oriented upward (into the flow of fluid starting through the upper portion 530 of the back pressure valve 520 toward the lower portion 540), and flow regulating device 545 is disposed in the opposite direction.

Flow regulating device 535 includes a conically shaped plunger valve 531, around a portion of which can be disposed an optional sealing member (e.g., a gasket, an o-ring, a high temperature high pressure elastomeric seal) disposed in a channel 516 in the plunger valve 531, a guide bore 533, and an extension 534 disposed between the guide bore 533 and the plunger valve 531. The flow regulating device 535 also includes a resilient device 532 disposed within the extension 534 and coupled to the guide bore 533. The guide bore 533 in this case is anchored within the body 559 (also called a body 559 because of its mostly solid structure) of the middle portion 550. The resilient device 532 is used to control the position of the plunger valve 531 of the flow regulating device 535 relative to the valve seat 567, which is an inner surface of part of the body 566 of the upper portion 530.

Similarly, flow regulating device 545 includes a conically shaped plunger valve 541, around a portion of which is disposed an optional sealing member (e.g., a gasket, an o-ring, a high temperature high pressure elastomeric seal) disposed in a channel 516 in the plunger valve 541, a piston 543, and an extension 544 disposed between the piston 543 and the plunger valve 541. The flow regulating device 545 also includes a resilient device 542 wrapped around the extension 544 and disposed between the piston 543 and the plunger valve 541. The resilient device 542 is used to control the position of the plunger valve 541 of the flow regulating device 545 relative to the valve seat 538, which is an inner surface of part of the body 562 of the lower portion 540. There is a volume of space 529 (also sometimes called a test chamber 529) within the lower portion 540 adjacent to the flow regulating device 545.

The flow regulating device 545 can also include a retaining feature 546, which is located around the extension 544 and also between the plunger valve 541 and the resilient device 542. The retaining feature 546 can be used to anchor one end of the resilient device 542. The retaining feature 546 can also be used to provide a stop that limits the plunger valve 541 at a fully open position.

As discussed above, the valve seat 567 of the upper portion 530 can be used to restrict how far the plunger valve 531 of the flow regulating device 535 can extend. Specifically, the valve seat 567 of the upper portion 530 can be configured to receive the plunger valve 531 of flow regulating device 535 so that, when the plunger valve 531 abuts against the valve seat 567, no fluid can flow into the middle portion 550 of the back pressure valve 520.

The valve seat 567 is part of an inner surface of the upper portion 530 and is angled in a manner that mirrors the outer surface of the plunger valve 531. In this way, when the plunger valve 531 abuts against the valve seat 567 of the upper portion 530, the plunger valve 531 blocks the passage of fluid through the cavity 537 that forms through the remainder (and, more specifically, through the network of channels 556 in the middle portion 550 and beyond) of the back pressure valve 520. At one or more locations throughout the back pressure valve 520, the various channels in the network of 556 can be configurable. For example, one or more plugs 514 can be used to close off a channel in the network of channels 556, prevent fluid from flowing therethrough. A plug 514 can be removable to reconfigure the network of channels 556 for subsequent use. Alternatively, a plug 514 can be a valve whose position (e.g., open position, closed position) can be changed.

The valve seat 538 can be used to restrict how far the plunger valve 541 of the flow regulating device 545 can extend downward. Specifically, the valve seat 538 can be configured, as shown in FIGS. 5C and 5D, to receive the plunger valve 541 of flow regulating device 545 so that, when the plunger valve 541 abuts against the valve seat 538, no fluid can flow beyond that point in the cavity 537. The valve seat 538 is part of an inner surface of the lower portion 540 and is angled in a manner that mirrors the outer surface of the plunger valve 541. In this way, when the plunger valve 541 abuts against the valve seat 538 of the lower portion 440, as shown in FIGS. 5C and 5D, the plunger valve 541 blocks the passage of fluid (either upward from downhole or downward from above) therethrough.

Flow regulating device 535 is movable within the middle portion 550 and the upper portion 530 of the back pressure valve 520, and flow regulating device 545 is movable within the middle portion 550 and the lower portion 540 of the back pressure valve 520. The position of a flow regulating device can regulate the amount of fluid that flows through that portion of the back pressure valve. In this case, the plunger valve 531 of flow regulating device 535 can move toward and away from the guide bore 533, which is anchored toward the top side of the middle portion 550, and the plunger valve 541 of flow regulating device 545 can move toward and away from the piston 543, which is anchored to the bottom side of the middle portion 550 within cavity 519 (also called a piston chamber 519) of the middle portion 550.

The position of flow regulating device 535 can be defined as the distance 549 between the valve seat 567 and the top (distal end) of the plunger valve 531. In FIG. 5C, which show flow regulating device 535 in a default (in this case, closed) position, the position of flow regulating device 535 is defined by distance 549. In this case, distance 549 is the same as distance 449 in FIG. 4C. Similarly, as shown in FIGS. 5C and 5D, the position of flow regulating device 545 can be defined as the distance 539 between the valve seat 538 and the top (distal end) of the plunger valve 541. In this case, flow regulating device 545 is in a closed position. In this case, distance 539 is less than distance 439 (the default position of flow regulating device 545).

There can be a number of channels 516 disposed along various outer surfaces of the body 559 of the middle portion 550 of the back pressure valve 520. In such a case, one or more sealing members (e.g., gaskets, o-rings, high temperature high pressure elastomeric seals) can be disposed within each channel 516 to provide a seal between the middle portion 550 of the back pressure valve 520 and another component of the back pressure valve 520 and/or another component of a corresponding system.

In addition, there can be a number of coupling features 517 (e.g., mating threads) disposed on various outer surfaces of the body 559 of the middle portion 550, various inner surfaces of the body 566 of the upper portion 530, and various inner surfaces of the body 562 of the lower portion 540. These coupling features 517 allow one portion (e.g., the middle portion 550) to couple to another portion (e.g., the upper portion 530, the lower portion 540) of the back pressure valve 520 and/or another component of a corresponding system.

In addition to the valve seat 567, the upper portion 530 of the back pressure valve 520 can have one or more inner surfaces disposed in the body 566. For example, inner surface 568 and inner surface 569, located adjacent to each other at the top end of the upper portion 530, can be configured (e.g., have a shape and size) in such a way as to receive the upper test port valve 575. Further, as shown in FIG. 5C, the network of channels 556 extends from the middle portion 550 to the upper portion 530 of the back pressure valve 520. This is a principal difference between the back pressure valve 520 of FIGS. 5A-8D and the back pressure valve 420 of FIGS. 4A-4C.

In addition to the valve seat 538, the lower portion 540 of the back pressure valve 520 can have one or more inner surfaces disposed in the body 562. For example, inner surface 561, located at the bottom end of the lower portion 540, can be configured (e.g., have a shape and size) in such a way as to receive another component of the system 599. In some cases, while not shown in FIGS. 5A-5D, one or more channels can be disposed within the body 562.

The middle portion 550 of the back pressure valve 520, as shown in detailed isolation in FIGS. 8A-8D, can have one or more of a number of channels of the network of channels 556 disposed in the body 559. These channels of the network of channels 556 can traverse the height of the middle portion 550 and allow fluid to flow therethrough, where this fluid can change the position of one or more of the flow regulating devices of the back pressure valve 520. Within these channels of the network of channels 556 can be disposed one or more of a number of components. For example, as shown in FIGS. 5C, 5D, and 8A, a check valve 552 and a pressure relief valve 551 can be disposed within a channel of the network of channels 556 in the middle portion 550.

The middle portion 550 of the back pressure valve 520 can also have a flow port header 576 disposed at the bottom end of the cavity 579 at the top end of the middle portion 550. The flow port header 576 can have any of a number of flow ports 577 disposed therein, where each flow part 577 represents one end of a channel of the network of channels 556 disposed within the body 559 of the main portion 550. In this case, as shown in FIG. 8B, there are eight (8) flow ports 577 in the flow port header 576. Each flow port 577 allows fluids to be pumped into the wellbore for well-control measures.

Figure 5B:
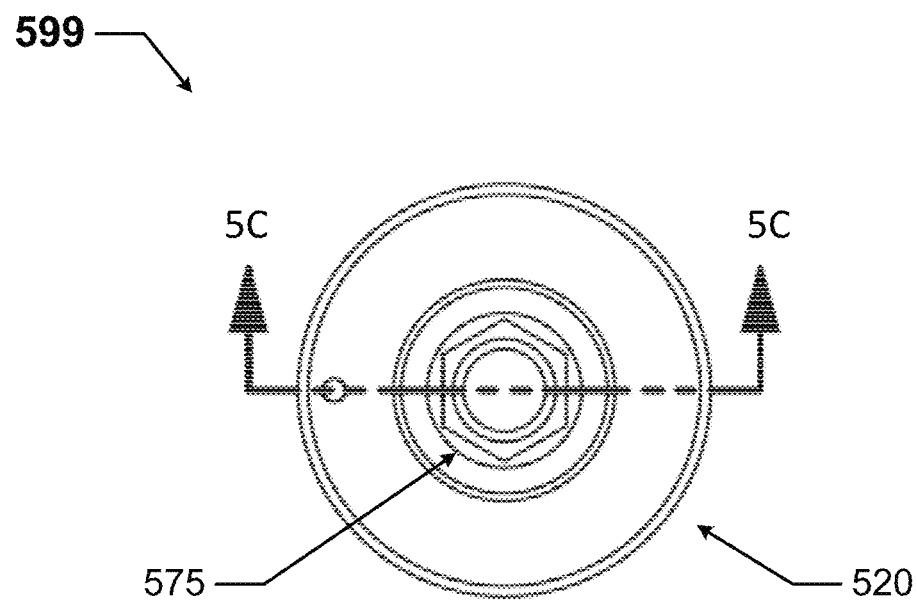
Figure 5C:
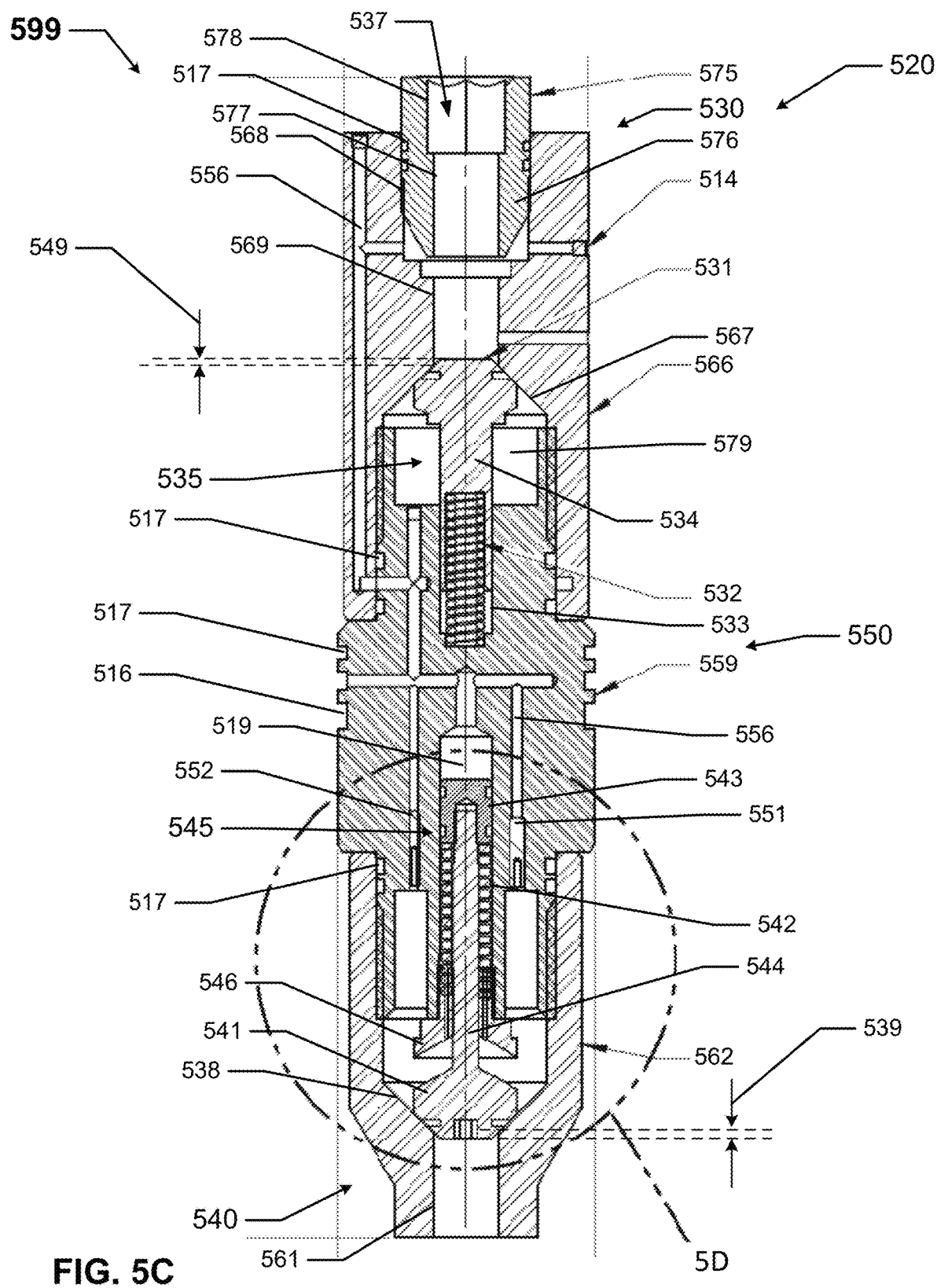
Figure 5D:
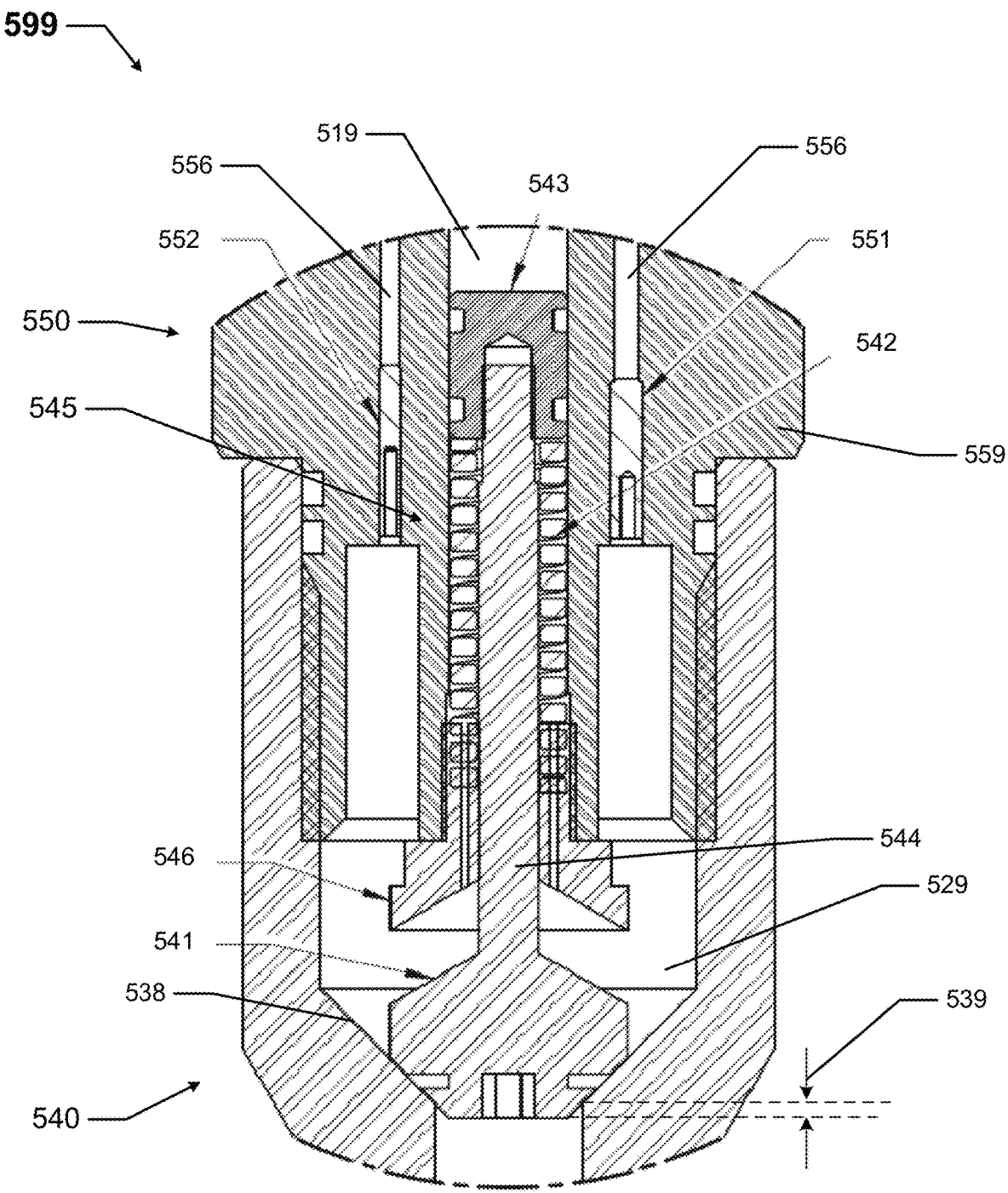

The upper test port valve 575 of the system 599 of FIGS. 5A-5D can be used to couple to a testing rod that facilitates testing thought the wellbore in lieu of the wellhead. This is for existing installations, where a wellhead test port, such as wellhead test port 471 of FIGS. 4A-4C, is not be available. The upper test port valve 575 can have an inner surface 578 that forms a cavity 537 that traverses the height of the upper test port valve 575. The inner surface 578 can have one or more of any number of features and/or configurations to accommodate a testing rod. For example, as shown in FIGS. 5A-5C, the inner surface 578 can have a hex-head configuration. Further, the outer surface of the upper test port valve 575 can have one or more coupling features 517 (in this case, mating threads) disposed thereon to complement coupling features disposed on the inner surface 568 of the upper portion 530 of the back pressure valve 520.

Figure 10:
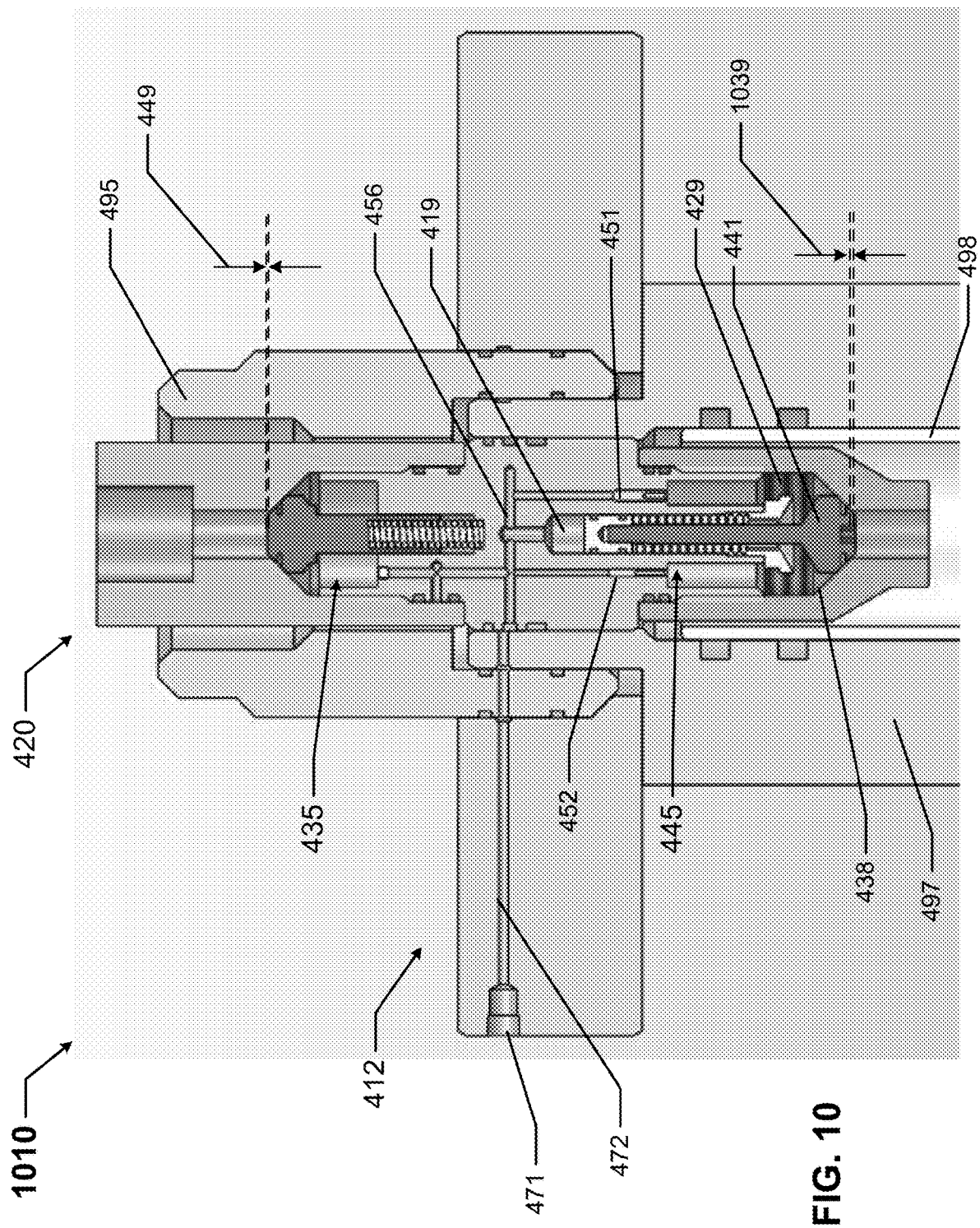
FIG. 10 shows the valve system of FIGS. 4A-4C configured in a second mode of operation in accordance with certain example embodiments.
Figure 11:
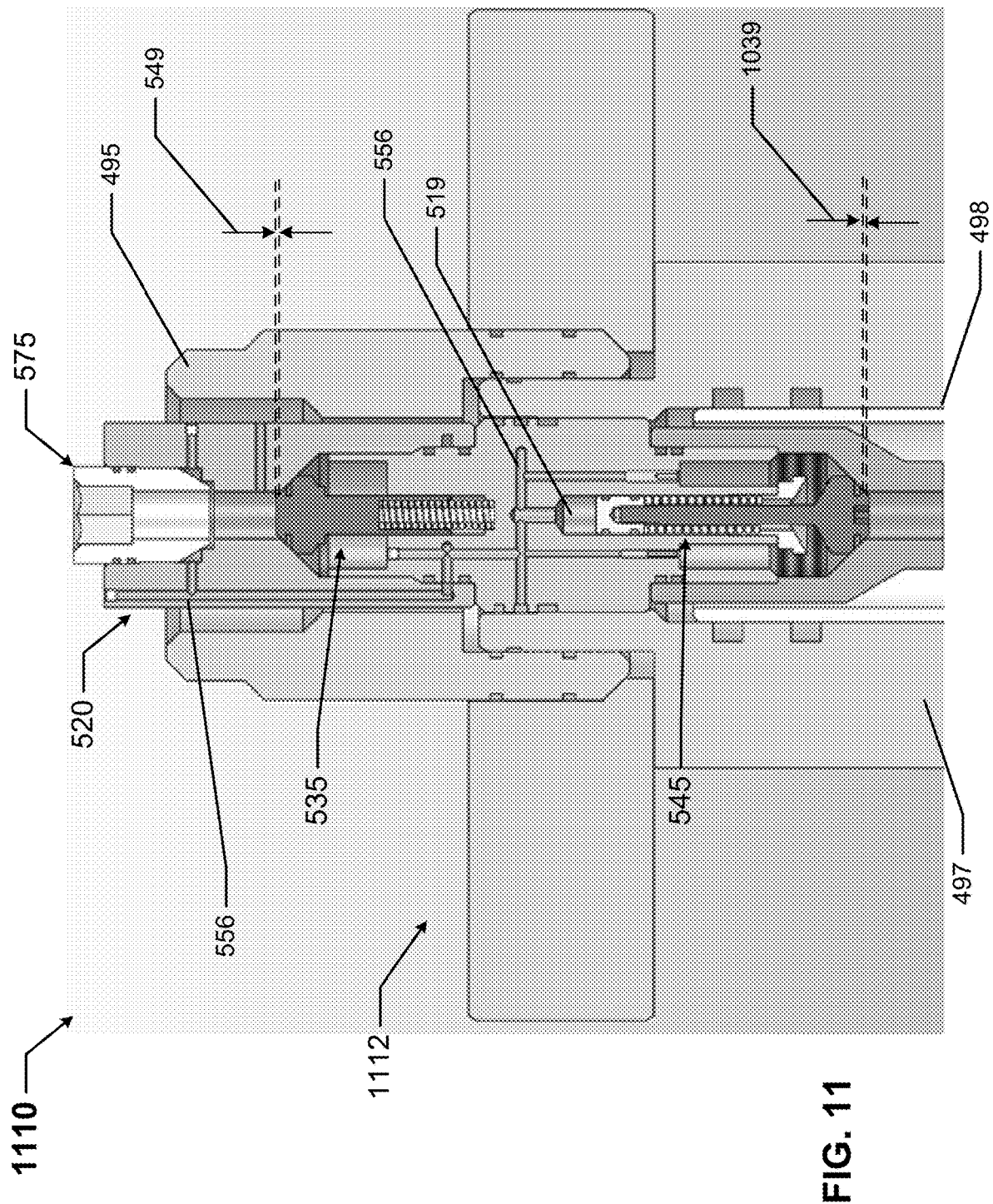
FIG. 11 shows another valve system configured in a third mode of operation in accordance with certain example embodiments.
Figure 12:
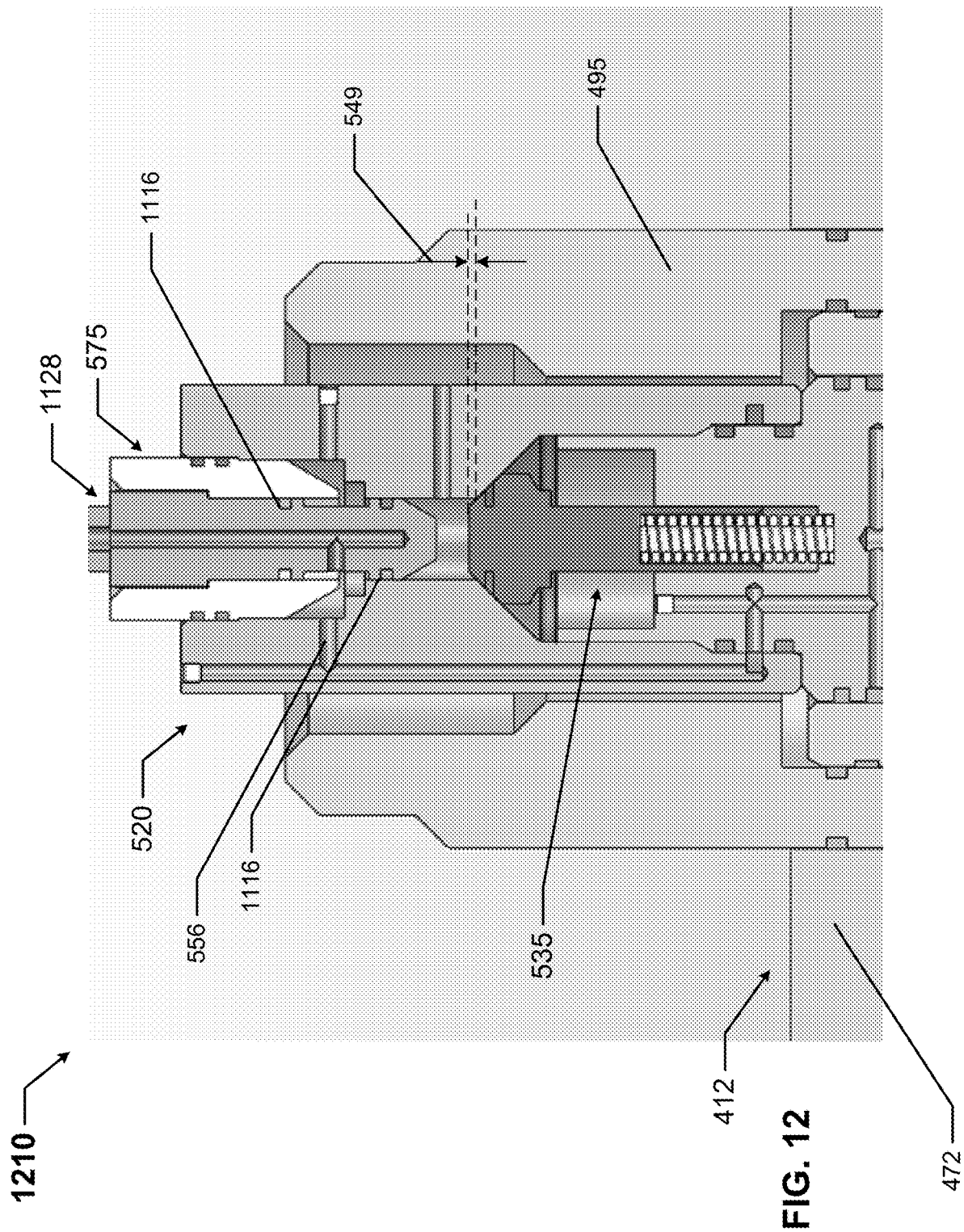
FIG. 12 shows a varied configuration of the valve system of FIG. 11 in accordance with certain example embodiments.

The position of each flow regulating device can vary based on, for example, the mode of operation and the flow rate of the fluid used during that mode of operation. FIG. 9 shows the valve system of FIGS. 4A-4C configured in a first mode of operation in accordance with certain example embodiments. FIG. 10 shows the valve system of FIGS. 4A-4C configured in a second mode of operation in accordance with certain example embodiments. FIG. 11 shows the valve system in a third mode of operation in accordance with certain example embodiments. FIG. 12 shows an alternative configuration of the valve system of FIG. 11 in accordance with certain example embodiments.

Referring to FIGS. 1-12, the first mode of operation shown in FIG. 9 is a kill fluid flow operation, where kill fluid is injected into the cavity 537. The valve system 910 of FIG. 9 includes the back pressure valve 420, which is surrounded by a casing head 412, a casing hanger 497, a casing string 498 that hangs from the casing hanger 497, and a casing hanger cap 495. Because the example back pressure valve 420 is testable, the casing head 412 includes a test port 471 at its outer edge and a channel 472 that leads from the test port 471 to the back pressure valve 420.

When the pressure of the kill fluid overcomes the force applied by the resilient device of the flow regulating device 435 and any wellhead pressure, moving the plunger valve of the flow regulating device 435 downward, thereby opening the flow regulating device 435, defined by distance 949. This allows the kill fluid to flow through the flow ports in the flow port header of the middle portion 450, through the network of channels 456 in the body 459 of the middle portion 450, around the flow regulating device 445 (in its normally-open position with distance 439), and eventually exiting the back pressure valve 420 and flowing downhole through the casing string 498.

The second mode of operation shown in FIG. 10 is pressure testing the back pressure valve 420 through the casing head 412. The valve system 1010 of FIG. 10 includes the back pressure valve 420, which is surrounded by a casing head 412, a casing hanger 497, a casing string 498 that hangs from the casing hanger 497, and a casing hanger cap 495. Because the example back pressure valve 420 is testable, the casing head 412 includes a test port 471 at its outer edge and a channel 472 that leads from the test port 471 to the back pressure valve 420.

Hydraulic testing can occur through the test port 471 located on the casing head 412 (also called a wellhead 412), through a channel 472 in the casing head 412, through a corresponding channel in the casing hanger cap 495, through a corresponding channel in the casing hanger 497, and through a corresponding channel network in the back pressure valve 420. Pressurized hydraulic fluid from a hand or electric hydraulic pump can be applied to the test port 471, which causes fluid to pressurize the piston chamber 419 leading to the plunger valve 441 of flow regulating device 445. The applied fluid pressure overcomes the force applied by the resilient device 442 of flow regulating device 445 and the wellbore pressure, causing the plunger valve 441 of flow regulating device 445 lower, putting the flow regulating device 445 to move to a closed position defined by distance 439. The flow regulating device 445 is closed when the plunger valve 441 abuts against and forms a seal with the valve seat 438.

Simultaneously, the test chamber return port check valve 452 disposed in the middle portion 450 of the back pressure valve 420 restricts the flow of test fluid into the test chamber 429 until its rated relief pressure (e.g., 3000 psi) is achieved. The test chamber return port check valve 452 acts as a secondary check valve to allow the test chamber to be de-pressurized once the test is complete, and is described in the following paragraphs. Under this configuration, the resilient device 442 of the flow regulating device 445 is always preloaded, and the plunger valve 441 is sealed/seated against the valve seat 438, leaving the flow regulating device 445 in a closed position. As the pressure exceeds the rating of the test chamber fill port pressure relief check valve 451, the test chamber fill port pressure relief check valve 451 will open, allowing the fluid to enter and fill the test chamber 429.

As the fluid continues to flow via the test chamber return port check valve 452 (which can also include a fill port of the test chamber 429), the fluid will again fill and pressurize the volume of space (e.g., the network of channels 456) between flow regulating device 435 and flow regulating device 445, both of which are in a closed position. As the test chamber 429 is pressurized to its test pressure, it will remain hydraulically locked in position, as long as the pressure at the test port 471 is maintained. This locking aspect of the testable back pressure valve 420 allows the back pressure valve 420 to also be used as a two way check valve, allowing components above the testable back pressure valve 420 to be pressure tested without having to install any additional components such as a stand-alone two way check valve or plug.

In order to reset the flow regulating device 445 of the back pressure valve 420 to its nominal operational condition (in this case, normally-open), pressure is simply released from the test port 471, thereby relieving pressure in the pressurized volume and test chamber through the test chamber fill port pressure relief check valve 451 and the test chamber return port check valve 452. This allows the plunger valve 441 to recede from the valve seat 438, and flow regulating device 445 is reset to its nominal operational configuration (an open position).

The third mode of operation shown in FIGS. 11 and 12 is testing through the wellbore, BOP, or surface equipment. The valve system 1110 of FIG. 11 includes the back pressure valve 520, which is surrounded by a casing head 1112, a casing hanger 497, a casing string 498 that hangs from the casing hanger 497, and a casing hanger cap 495. (In some cases, the casing hanger cap 495 can be considered part of the casing hanger 497.) In this case, the casing head 1112 does not includes a test port at its outer edge or a channel, and so the testing of the back pressure valve 520 must be done through the wellbore, BOP, or surface equipment. An upper test port valve 575 is coupled to the top portion 530 of the back pressure valve 520.

When the upper test port valve 575 is coupled (e.g., threaded) to the top portion 530 of the back pressure valve 520, the upper test port valve 575 seats and seals on a metal-to-metal shoulder seat, sealing the network of channels 556 (or one or more portions thereof) from pressures/fluids (e.g., kill fluid pressure, test pressures) above the upper test port valve 575. When testing of the back pressure valve 520 is required, a testing rod 1128 with a coupling feature (e.g. a threaded hex head) is coupled to the upper test port valve 575 and is rotated (e.g., counter clockwise) to un-seat and un-seal the network of channels 556 (or one or more portions thereof). The testing rod 1128 can include one or more channels 1116 disposed along its outer perimeter and into which sealing devices (e.g., o-rings) can be disposed.

In some cases, the channels 1116 can be disposed above and below the interface between the upper test port valve 575 and the upper portion 530 of the back pressure valve 520. This can allow the pressurized fluid to flow into the network of channels 556 (or one or more portions thereof) and actuate (close) the flow regulating device 545, as previously described. Hydraulic pressure can be applied from an external source (pump) via the testing rod 1128. Once testing is complete, the testing rod 1128 can be uncoupled from the upper test port valve 575, which puts the flow regulating device 545 back in the default (open) position.

The systems, methods, and apparatuses described herein allow for testable back pressure valves. Example embodiments can control the flow of fluid for various modes of operation (testing) of a back pressure valve while the back pressure valve controls wellbore pressures. The pressure barriers of example embodiments are fully testable, above and below the back pressure valve unit, after installation. Once installed, example embodiments prevent the uncontrolled flow of downhole hydrocarbon fluids and gasses to the surface, but allow fluids to be pumped into the wellbore for well control/kill operations. As a result, example embodiments save time, ensure safe and more reliable operations, and use fewer resources compared to embodiments currently used in the art.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A testable back pressure valve, comprising:
    a body;
    a first flow regulating device movably disposed within a top end of the body, wherein the first flow regulating device is configured to move from a first default position to a first position based on first flow characteristics of a first fluid that flows into a top end of the body toward a bottom end of the body;
    a second flow regulating device movably disposed within the bottom end of the body; and
    a network of channels disposed within the body between the first flow regulating device and the second flow regulating device,
    wherein the second flow regulating device moves independently of the first flow regulating device, and
    wherein the first flow regulating device and the second flow regulating device are inverted relative to each other.

2. The testable back pressure valve of claim 1, wherein the first default position of the first flow regulating device is a first closed position that prevents downhole fluids from passing upward around the first flow regulating device.

3. The testable back pressure valve of claim 2, wherein the network of channels is further disposed within the body above the first flow regulating device, wherein the network of channels allow the first fluid to flow toward the second flow regulating device when the first flow regulating device is in the first closed position.

4. The testable back pressure valve of claim 1, wherein the first position of the first flow regulating device is a first open position that allows kill fluid to flow around the first flow regulating device toward the bottom end of the body.

5. The testable back pressure valve of claim 1, wherein the second flow regulating device has a second default position, wherein the second default position is an open position that allows the first fluid to pass therethrough.

6. The testable back pressure valve of claim 5, wherein the second flow regulating device further has a second position, wherein the second position is a closed position that prevents the first fluid from passing therethrough.

7. The testable back pressure valve of claim 1, wherein the network of channels is configurable.

8. The testable back pressure valve of claim 7, further comprising:
    at least one plug disposed in the network of channels, wherein the at least one plug prevents flow of the first fluid therethrough.

9. The testable back pressure valve of claim 7, further comprising:
    at least one check valve disposed in the network of channels, wherein the at least one check valve prevents flow of the first fluid in one direction and allows flow of the first fluid in an opposing direction.

10. The testable back pressure valve of claim 1, wherein the first flow regulating device comprises a first spring valve, and wherein the second flow regulating device comprises a second spring valve.

11. The testable back pressure valve of claim 1, wherein the network of channels is configured to receive a test fluid from an external component of a system when the first flow regulating device is in the first default position.

12. The testable back pressure valve of claim 1, wherein the second flow regulating device comprises a resilient device that returns the second flow regulating device to an open position when the first flow characteristics of the first fluid fall below a threshold level.

13. The testable back pressure valve of claim 1, wherein the first flow regulating device and the second flow regulating device are configured differently from each other.

14. The testable back pressure valve of claim 1, wherein the first flow regulating device comprises a resilient device that returns the first flow regulating device to the first default position when the first flow characteristics of the first fluid fall below a threshold level.

15. The testable back pressure valve of claim 1, wherein the body comprises an upper portion, a lower portion, and a middle portion disposed therebetween, wherein the first flow regulating device is nested within the upper portion and the middle portion, and wherein the second flow regulating device is nested within the lower portion and the middle portion.

16. A valve system comprising:
    a casing head; and
    a testable back pressure valve disposed within the casing head, wherein the testable back pressure valve comprises:
        a body;
        a first flow regulating device movably disposed within a top end of the body, wherein the first flow regulating device is configured to move from a first default position to a first position based on first flow characteristics of a first fluid that flows into a top end of the body toward a bottom end of the body;
        a second flow regulating device movably disposed within the bottom end of the body; and
        a network of channels disposed within the body between the first flow regulating device and the second flow regulating device,
        wherein the second flow regulating device moves independently of the first flow regulating device, and
        wherein the first flow regulating device and the second flow regulating device are inverted relative to each other.

17. The system of claim 16, wherein the casing head comprises a test port and a casing head channel connected to the test port, wherein the casing head channel is coupled to the network of channels of the testable back pressure valve.

18. The system of claim 16, further comprising:
a testing rod coupled to an upper end of the testable back pressure valve.

\* \* \* \* \*